(12) United States Patent
Pietraski et al.

(10) Patent No.: US 12,535,552 B2
(45) Date of Patent: Jan. 27, 2026

(54) METHODS, ARCHITECTURES, APPARATUSES AND SYSTEMS DIRECTED TO DATA AUGMENTATION OF RADIO FREQUENCY (RF) DATA FOR IMPROVED RF FINGERPRINTING

(71) Applicant: DRNC Holdings, Inc., Wilmington, DE (US)

(72) Inventors: Philip Pietraski, Jericho, NY (US); Sudhir Pattar, Mount Laurel, NJ (US); Paul Russell, Lawrence, NJ (US); Miranda Pietraski, Jericho, NY (US)

(73) Assignee: DRNC Holdings, Inc., Wilmington, DE (US)

( * ) Notice: Subject to any disclaimer, the term of this patent is extended or adjusted under 35 U.S.C. 154(b) by 281 days.

(21) Appl. No.: 18/279,635

(22) PCT Filed: Mar. 4, 2022

(86) PCT No.: PCT/US2022/018919
§ 371 (c)(1),
(2) Date: Aug. 1, 2023

(87) PCT Pub. No.: WO2022/187627
PCT Pub. Date: Sep. 9, 2022

(65) Prior Publication Data
US 2024/0012087 A1 Jan. 11, 2024

Related U.S. Application Data

(60) Provisional application No. 63/156,818, filed on Mar. 4, 2021.

(51) Int. Cl.
*G01S 5/02* (2010.01)
*H04L 25/02* (2006.01)

(52) U.S. Cl.
CPC ........ *G01S 5/0252* (2013.01); *H04L 25/0212* (2013.01); *H04L 25/0254* (2013.01)

(58) Field of Classification Search
CPC ............... G01S 5/0252; H04L 25/0212; H04L 25/0254; G06N 3/045; G06N 3/08
(Continued)

(56) References Cited

U.S. PATENT DOCUMENTS 11,184,783 B1 * 11/2021 Melodia ................. G06N 3/084
11,444,702 B2 * 9/2022 Sadhu .................. G06N 3/0675
(Continued)

OTHER PUBLICATIONS

Youssef Khalid, et al.: "Machine Learning Approach to RF Transmitter Identification", IEEE Journal of Radio Frequency Identification, vol. 2, No. 4, Dec. 2018, 9 pages.
(Continued)

*Primary Examiner* — Juan A Torres
(74) *Attorney, Agent, or Firm* — Majid Albassam

(57) ABSTRACT

Procedures, methods, architectures, apparatuses, systems, devices, and computer program products directed to data augmentation of radio frequency (RF) data for improved RF fingerprinting are provided. Among the methods is method that may include any of obtaining one or more samples by sampling a radio frequency (RF) signal received at a receiver from a transmitter; determining one or more channel characteristics of a channel between the receiver and the transmitter; and performing RF fingerprinting based at least in part on (i) inputting the samples and the channel characteristics as inputs to a neural network formed using a trained neural network model, and (ii) obtaining a predicted value output from the neural network.

52 Claims, 13 Drawing Sheets

(58) Field of Classification Search
USPC .................................................. 455/456.1
See application file for complete search history.

(56) References Cited

U.S. PATENT DOCUMENTS

2020/0314641 A1    10/2020  Tewari et al.
2022/0124487 A1*   4/2022   Lin ........................ G06N 3/08

OTHER PUBLICATIONS

Roy Debashri, et al.: "Machine Learning in Adversarial RF Environments", IEEE communications Magazine, May 2019, 6 pages.
Metehan Cekic, et al.: "Robust Wireless Fingerprinting: Generalizing Across Space and Time", IEEE, Jul. 2020, 18 pages.

* cited by examiner

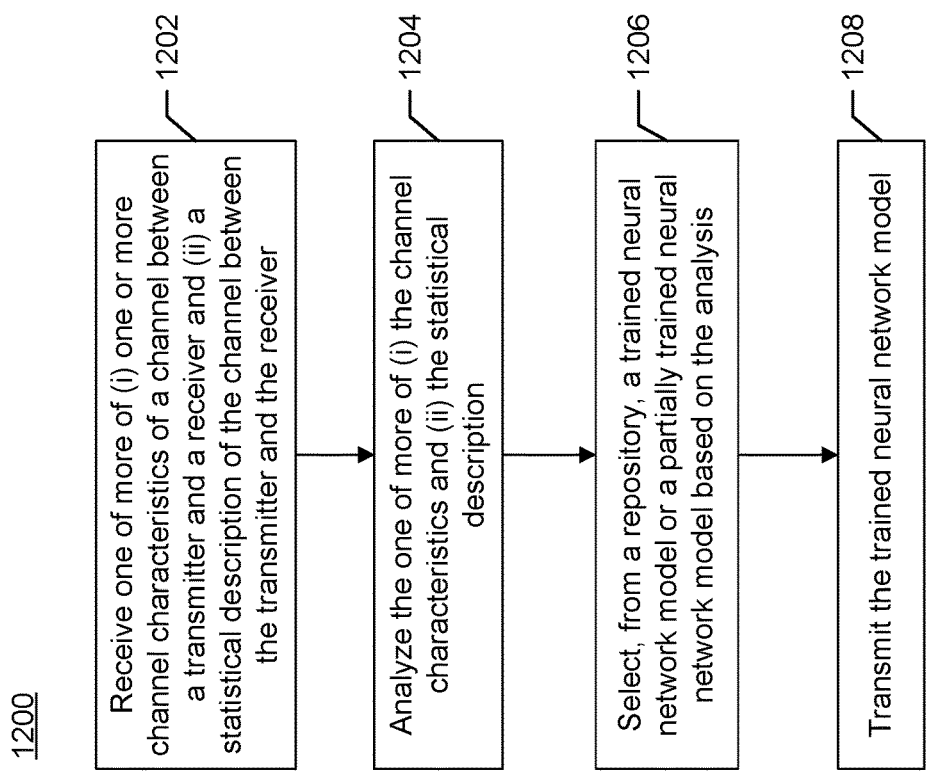

METHODS, ARCHITECTURES, APPARATUSES AND SYSTEMS DIRECTED TO DATA AUGMENTATION OF RADIO FREQUENCY (RF) DATA FOR IMPROVED RF FINGERPRINTING

CROSS-REFERENCE TO RELATED APPLICATIONS

This application is a U.S. National Stage Application under 35 U.S.C. 371 of International Patent Application No. PCT/US2022/018919, filed Mar. 4, 2022, which claims the benefit of U.S. Provisional Application No. 63/156,818, filed 4 Mar. 2021; each of which is incorporated herein by reference in their entirety.

BACKGROUND

Embodiments disclosed herein generally relate to wireless and/or wired communications and, for example to methods, architectures, apparatuses and systems directed to data augmentation of radio frequency (RF) data for improved RF fingerprinting, e.g., where the RF data may be augmented using (or based on) any of one or more models of radio propagation, one or more models of radio impairments, frequency drift, and one or more interference models.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein:

FIGS. 7-13 are flow charts illustrating example flows.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
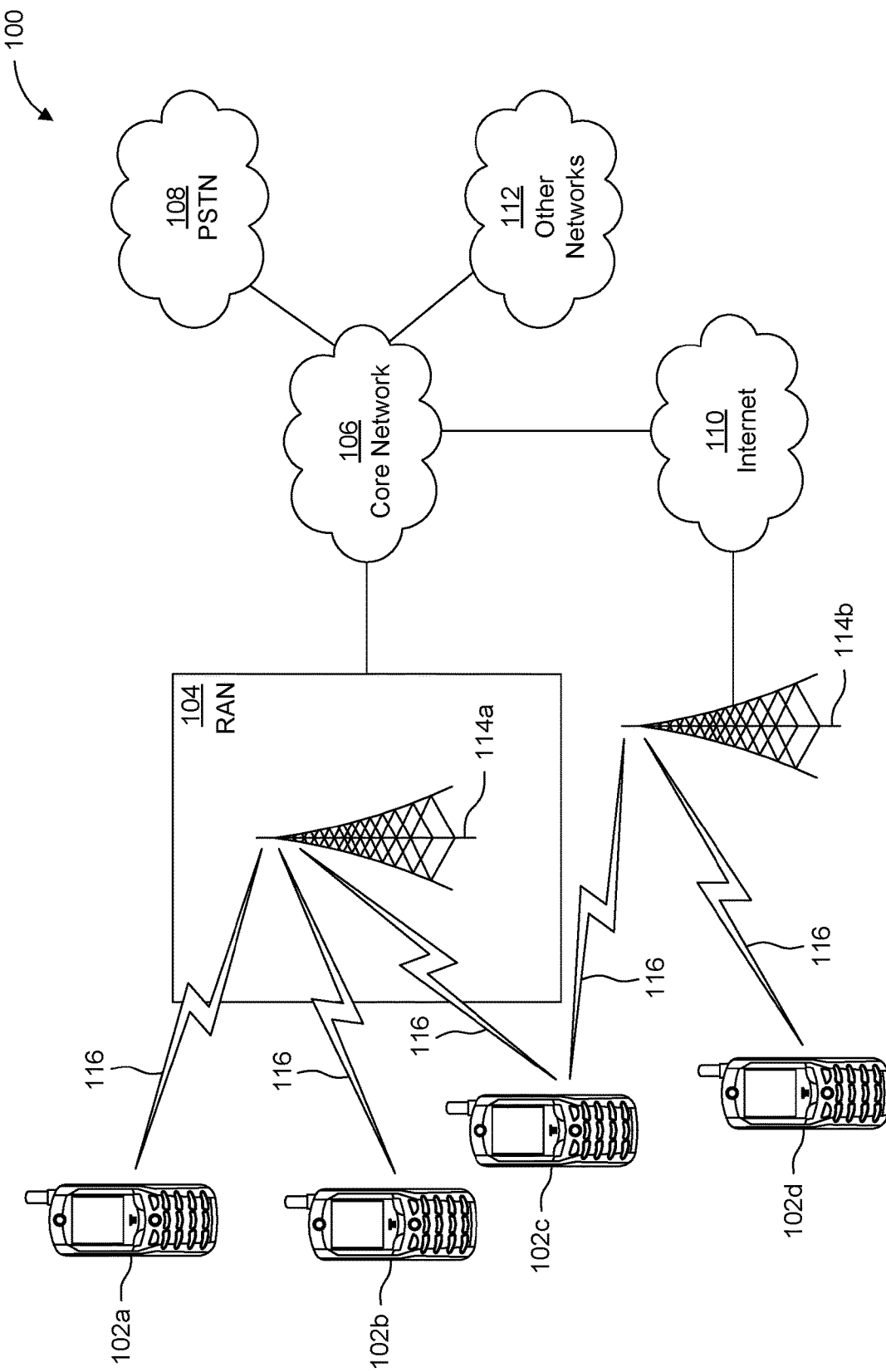
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 4A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
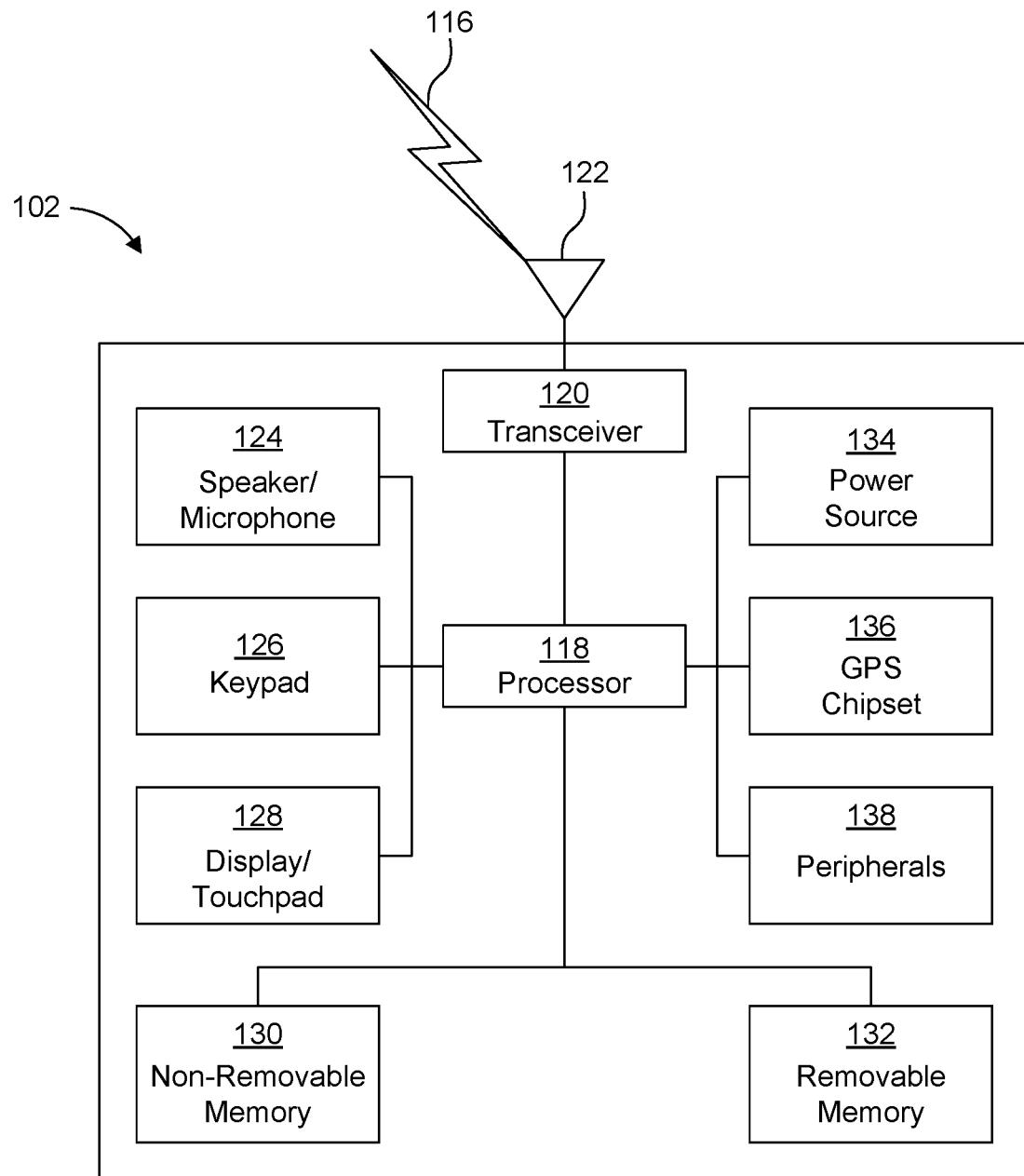
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
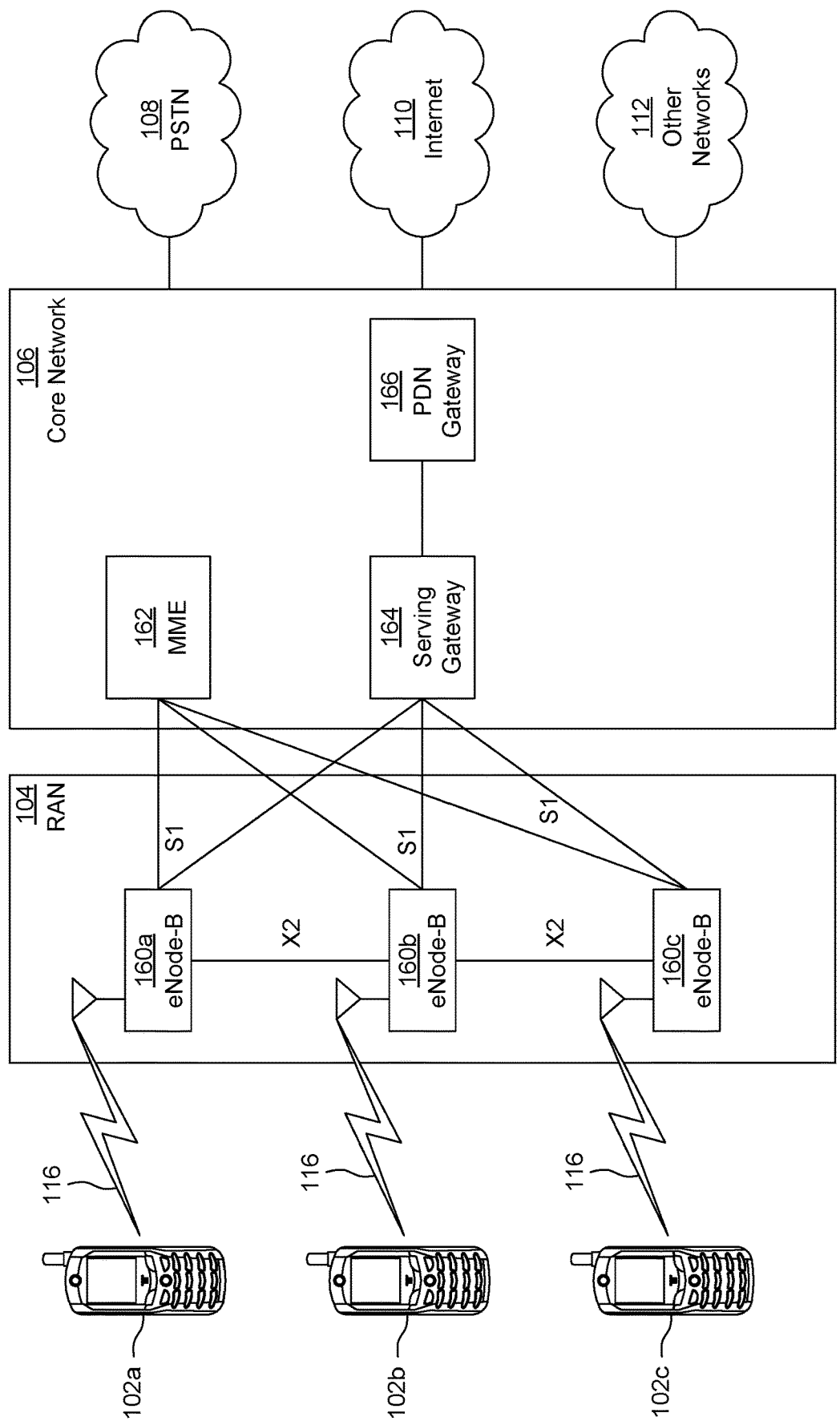
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
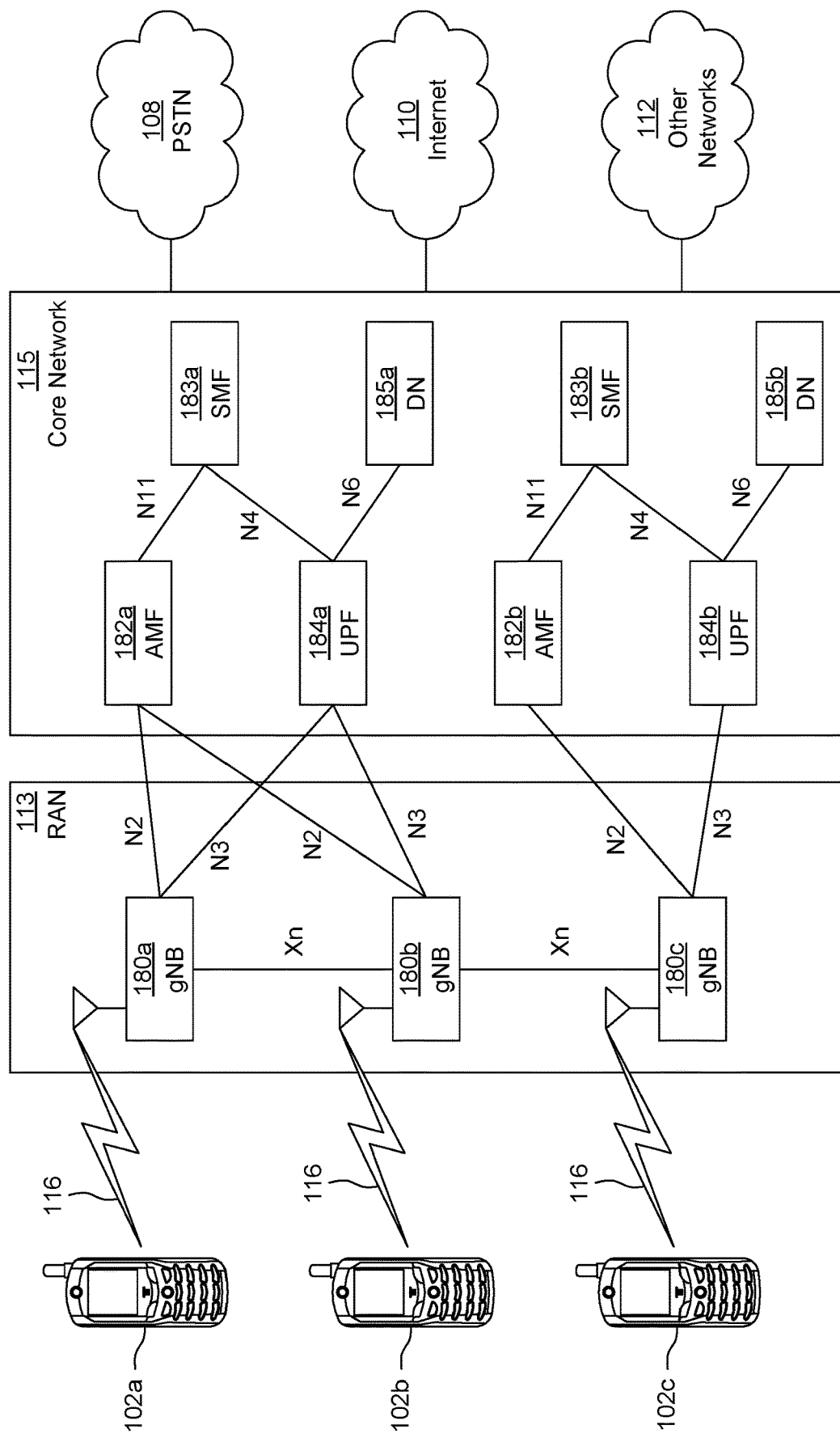
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

An internet of things, (IoT) in general, refers to a system of computing devices ("things") that are capable of exchanging data over a network, such as an internet, with little or no human interaction. The overall IoT market is expected to expand to 75 B devices and $4-11 T in economic impact by 2025 according to IHS (2016). According to Juniper research, service revenues from Low-Power IoT will grow 800% over the next five years and will exceed $2.6 billion by 2024.

The things in IoT ("IoT devices") can take many forms. An IoT device may be a sensor or actuator in a home, sensors to issue a warning if tire pressure is low, or any other thing that can be assigned an routable (e.g., IP) address. IoT devices penetrate commercial, personal, and government markets and are deployed in critical applications such as in factories, city infrastructure, worksites, utilities and health care. Low-power, low-cost, wireless IoT devices are of particular interest since they provide a means for simple and low-cost deployment of large networks thereof, and incentivize or at least removes some impediments to adoption for various applications, e.g., those that demand low-cost, low-power and/or wireless communications.

By way of example, several IoT RATS have already seen widespread adoption such as Long Range (LoRa) and Sigfox. Longer term, the 5G solution to wide coverage with support for many low data-rate devices is Narrow Band IoT (NB-IoT) and is expected to attain a larger market share. For IoT to fulfill its desired role of supporting dense sensor deployments, IoT radios must be both low power and low cost. Both of these requirements run counter to security.

One of the remaining impediments to large-scale adoption is cybersecurity. Cybersecurity remains a concern especially for low-cost, low-power IoT devices. The concern is only amplified by the sheer number of such devices that are envisioned to be connected to, e.g., a smart city network—thus creating a large attack surface. Currently, one third of IoT security breaches happen at the end points. Battery, memory and processing limitations of low-cost, low-power IoT devices make it difficult to robustly secure an IoT.

Radio frequency (RF) fingerprinting (RFFP) is one of a number of cybersecurity tools that may be used (e.g., by network operators) to prevent spoofing emitters from accessing networks. RFFP, in general, is carried out in two stages, namely extracting RF fingerprints and performing identification based on RF fingerprint. The RF fingerprints are reflections of differences between hardware components of transmitters, and the differences can be reflected in communication signals. The differences between hardware components of transmitters are, at least in part, due to differences in analog and RF components of the transmitters that result from process variation during manufacturing and assembly. This is particularly true of low-cost devices. The RF fingerprints can be extracted by processing transient signals or steady-state signals from received RF signals. The elements of an RF fingerprint of a transmitter include unique (and usually, subtle) radio transmission characteristics of that transmitter. The terms "radio" and "transmitter" may be interchangeably referred to herein. One problem with conventional RFFP techniques is that they do not scale to a large number of devices. One barrier to such scaling is that the conventional RFFP techniques rely on a single, or at best, a few, transmitter characteristics and such transmitter characteristics are those that (i) are well understood by RF engineers and (ii) can be extracted by hand engineering.

There is a need for improved RFFP that can be utilized in an IoT and/or that minimizes its impact on power consumption of the IoT devices and/or network elements.

Although motivated by IoT, RFFP also has general application to detection of spoofing transmitters of any type for which there is sufficient training data available including other mobile device types and infrastructure elements. For example, the growing trend for small cells and private networks make it more important for a UE to validate infrastructure elements (base stations, access points, gateways, etc.).

Pursuant to RFFP, a transmitter (radio) and/or, by extension, a device including a transmitter may be identified based on one or more signal impairments attributed to the transmitter The signal impairments attributed to the transmitter may be based on, for example, I/Q phase imbalance and/or power amplifier (PA) ramp up profile. The impairments of a particular transmitter/radio impart a unique signature to a signal transmitted from the transmitter/radio. The unique signature can be learned at a receiver and used, e.g., in a neural network (NN) configured for RFFP classification and/or spoofing detection (collectively "RFFP neural network"). However, the signal that is received at the receiver exhibits other impairments that are not attributable to the transmitter. A result of this is that, in conventional RFFP, the signal input to an RFFP neural network includes impairments from the transmitter and from other sources. These other sources include the multi-path channel, the receiver, and interference from other transmitters (co-channel or adjacent channel interference). The impairments that are not associated with the transmitter may cause the RFFP algorithm to learn to incorrectly associate these non-transmitter related impairments with particular transmitters. This may cause a false confidence in RFFP performance. For example, if the RFFP neural network is trained at one ("first") location and is deployed at a different ("second") location where the channel statistics are different, then the non-transmitter related impairments (e.g., channel related impairments) may obfuscate the transmitter related impairments; thereby making the transmitter harder to identify and/or causing the transmitter to look more like a radio that was once also in this location. One way to circumvent the RFFP algorithm from learning to incorrectly associate the non-transmitter related impairments with particular transmitters (albeit cost prohibitive and likely impossible due constantly changing environments) is to move each transmitter to many locations and operate it in many different traffic scenarios so that the RFFP neural network could learn to classify radios based only on the properties of the transmitter rather than on where the transmitter is deployed. Some specific problems addressed are:

The Multi-Path Channel

Training a neural network for RFFP is susceptible to learning the channel rather than learning the unique signature of, and/or signal impairments attributed to, the transmitter (sometimes referred to herein as "Tx radio impairments"). Collecting data for transmitters from large geographic regions to get more channel experiences in the data is cost prohibitive.

Carrier Frequency Offset (CFO)

CFO can vary over time at a Tx device and can appear to change due to Doppler effects. Training a neural network for RFFP is susceptible to learning Rx CFO in receiving devices as this is source for apparent CFO changes in Tx devices.

Interference

In most modern wireless systems, interference is common and typically bursty since traffic has become bursty as wireless systems evolved beyond providing voice services. RFFP performance can be substantially degraded by such interference. RFFP performance needs to be made more robust and/or become interference aware.

Portability

The data augmentation can be customized for a site of interest, but this would imply a need to re-train the neural networks for each site with statistically different typical channel realization. While this is possible, such a solution would require substantial computational power and data storage at the site, the resulting would lack uniformity across the network, and information about the channel would not be shared with other RFFP blocks in the network, nor would this RFFP block benefit from other sites.

These problems may be mitigated pursuant to the new and inventive methodologies and technologies disclosed herein.

Overview

As would be appreciated by a person of skill in the art based on the teachings herein, encompassed within the embodiments described herein, without limitation, are procedures, methods, architectures, apparatuses, systems, devices, and computer program products directed to radio frequency (RF) fingerprinting using RF data augmentation (e.g., augmenting RF data using (or based on) any of one or more models of radio propagation, one or more models of radio impairments, frequency drift, and one or more interference models).

Among the procedures, methods, architectures, apparatuses, systems, devices, and computer program products is a first method that that may include any of: augmenting samples of one or more RF signals based on one or more signal impairments, and training a neural network using the augmented samples.

In various embodiments, the one or more signal impairments may include signal impairments other than those associated or attributed to a transmitter, e.g., a particular transmitter.

In various embodiments, the one or more signal impairments may include one or more signal impairments that occur after transmission.

In various embodiments, the one or more signal impairments may include one or more propagation characteristics typical of a link between a transmitter and a receiver.

In various embodiments, augmenting the samples of the one or more RF signals may include augmenting the samples using one or more transforms that mimic the one or more signal impairments.

In various embodiments, the one or more transforms may include one or more transforms that mimic one or more propagation characteristics typical of a link between a transmitter and a receiver.

In various embodiments, the first method may include generating the one or more transforms based on the one or more signal impairments. In various embodiments, augmenting the samples may include applying the one or more transforms to the samples.

Among the procedures, methods, architectures, apparatuses, systems, devices, and computer program products is a second method that that may include any of: augmenting samples of one or more RF signals based on one or more propagation characteristics typical of a link between a transmitter and a receiver, and training a neural network using the augmented samples.

In various embodiments, augmenting samples of one or more RF signals may include augmenting the samples using one or more transforms that mimic one or more propagation characteristics typical of a link between a transmitter and a receiver.

In various embodiments, the second method may include generating the one or more transforms based on the one or more propagation characteristics. In various embodiments, augmenting the samples may include applying the one or more transforms to the samples.

In various embodiments, at least one of the one or more transforms may mimic a realistic channel impulse response (CIR). In various embodiments, the at least one transform may be (or include) a finite impulse response (FIR) filter. The FIR filter may be (or include) a time-varying FIR filter.

In various embodiments, at least one of the one or more transforms may mimic a realistic channel frequency spectrum. In various embodiments, the at least one transform may include a frequency domain filter. In various embodiments, applying the one or more transforms to the samples may include performing element-wise multiplication of the samples with filter coefficients of the filter in the frequency domain.

In various embodiments, the second method may include labeling the trained neural network. In various embodiments, labeling the trained neural network may include labeling the trained neural network based on a characteristic of a network or environment in which the transmitter and/or receiver is deployed.

In various embodiments, the second method may include saving the labeled, trained neural network as a neural network model.

In various embodiments, the second method may include any of obtaining samples by sampling an RF signal received at a receiver from a transmitter; and performing RF fingerprinting based at least in part on (i) inputting the samples and information characterizing a link between the transmitter and the receiver to the trained neural network, and (ii) obtaining a predicted value output from the trained neural network.

Among the procedures, methods, architectures, apparatuses, systems, devices, and computer program products is a third method that that may include any of: obtaining samples by sampling an RF signal received at a receiver from a transmitter; estimating a CIR of a channel between the receiver and the transmitter; generating/determining a statistical description of the channel based at least in part on the estimated CIR or an accumulation of estimated CIRs; obtaining a trained neural network model based on the statistical description of the channel; and performing RF fingerprinting based at least in part on (i) inputting the samples and the estimated CIR or the accumulation of estimated CIRs and/or statistical description of the channel as inputs to a neural network formed using the trained neural network model; and (ii) obtaining a predicted value output from the neural network.

In various embodiments, obtaining a trained neural network model based on the statistical description of the channel may include selecting the trained neural network model from a repository based on the statistical description of the channel. In various embodiments, obtaining a trained neural network model based on the statistical description of the channel may include determining the trained neural network model based on the statistical description of the channel.

In various embodiments, statistics are input to the neural network in connection with performing RF fingerprinting.

Among the procedures, methods, architectures, apparatuses, systems, devices, and computer program products is a fourth method that that may include any of: obtaining samples of an RF signal; determining any of (i) an estimate of a CIR of a first channel through which the RF signal transited and/or (ii) an accumulation of estimated CIRs of the first channel; determining a first statistical description of the first channel based on the estimated CIRs and/or the accumulated CIR; and deploying a neural network configured for RFFP classification and/or spoofing detection using a neural network model configured for RFFP classification and/or spoofing detection and trained using RF data augmented for a second channel having with a second statistical description that matches (e.g., best matches), is akin to, etc. first statistical description of the first channel.

In various embodiments, the fourth method may include any of inputting the obtained RF samples into the trained neural network; and obtaining one or more predicted classifications or a spoofing decision for the RF samples output from the trained neural network.

Among the procedures, methods, architectures, apparatuses, systems, devices, and computer program products is a fifth method that may include any of: obtaining one or more samples by sampling an RF signal received at a receiver from a transmitter; determining one or more channel characteristics of a channel between the receiver and the transmitter; and performing RF fingerprinting based at least in part on (i) inputting the one or more samples and the one or more channel characteristics as inputs to a neural network formed using a trained neural network model, and (ii) obtaining a predicted value output from the neural network. In various embodiments, one or more statistical channel descriptions may be input to the neural network in connection with performing RF fingerprinting.

Among the procedures, methods, architectures, apparatuses, systems, devices, and computer program products is a sixth method that may include any of: obtaining one or more samples by sampling an RF signal received at a receiver from a transmitter; determining one or more channel characteristics of a channel between the receiver and the transmitter; and performing spoof detection based at least in part on (i) inputting the one or more samples and the one or more channel characteristics as inputs to a neural network formed using a trained neural network model, (ii) obtaining a predicted value output from the neural network, and (iii) determining that an identifier of the transmitter is spoofed or not spoofed based on the predicted value and one or more criteria. In various embodiments, one or more statistical channel descriptions may be input to the neural network in connection with performing spoof detection.

Among the procedures, methods, architectures, apparatuses, systems, devices, and computer program products is a seventh method that may include any of: obtaining one or more samples of an RF signal; determining one or more channel characteristics of a first channel through which the RF signal transited; determining a statistical description of the first channel based on the channel characteristics; and deploying a neural network using a trained neural network model trained using RF data augmented based on a second channel having a different statistical description, wherein the different statistical description at least in part corresponds to the statistical description of the first channel.

In various embodiments, the method may include any of performing RF fingerprinting and performing spoof detection. In various embodiments, the method may include performing RF fingerprinting may be based at least in part on (i) inputting the samples and the channel characteristics (as inputs) to the neural network, and (ii) obtaining a predicted value output from the neural network. In various embodiments, the method may include performing spoof detection may be based at least in part on (i) inputting the one or more samples and the one or more channel characteristics as inputs to the neural network, (ii) obtaining a predicted value output from the neural network, and (iii) determining that an identifier of a transmitter is spoofed or not spoofed based on the predicted value and one or more criteria.

Among the procedures, methods, architectures, apparatuses, systems, devices, and computer program products is an eighth method that may include any of: obtaining one or more samples by sampling an RF signal received (e.g., at a receiver) from a transmitter; and performing RF fingerprinting based on (i) inputting the samples and one or more channel characteristics (as inputs) to a neural network formed using a trained neural network model, wherein the channel characteristics may include one or more channel characteristics of the channel between the receiver and the transmitter, and (ii) obtaining a predicted value output from the neural network. In various embodiments, one or more statistical channel descriptions may be input to the neural network in connection with performing RF fingerprinting.

Among the procedures, methods, architectures, apparatuses, systems, devices, and computer program products is a ninth method that may include any of: obtaining one or more samples by sampling an RF signal received (e.g., at a receiver) from a transmitter; performing spoof detection based on (i) inputting the samples and one or more channel characteristics (as inputs) to a neural network formed using a trained neural network model, wherein the channel characteristics may include one or more channel characteristics of the channel between the receiver and the transmitter, obtaining a predicted value output from the neural network, and determining that an identifier of the transmitter is spoofed or not spoofed based on the predicted value and one or more criteria. In various embodiments, one or more statistical channel descriptions may be input to the neural network in connection with performing spoof detection.

In various embodiments of at least the fifth, sixth, seventh, eighth and ninth methods, the methods may include determining a statistical description of the channel based at least in part on the one or more channel characteristics, and/or obtaining the trained neural network model based on the statistical description of the channel.

Among the procedures, methods, architectures, apparatuses, systems, devices, and computer program products is a tenth method that may include any of: obtaining one or more samples of a RF signal; determining one or more channel characteristics of a first channel through which the RF signal transited; determining a statistical description of the first channel based on the one or more channel characteristics; and deploying a neural network using a trained neural network model trained using RF data augmented based on a second channel having a different statistical description, wherein the different statistical description at least in part corresponds to the statistical description of the first channel.

In various embodiments, the method may include any of performing RF fingerprinting and performing spoof detection. In various embodiments, the method may include performing RF fingerprinting based on inputting the samples and the channel characteristics (as inputs) to the neural network, and obtaining a predicted value output from the neural network. In various embodiments, the method may include performing spoof detection based on inputting the samples and the channel characteristics (as inputs) to the neural network, obtaining a predicted value output from the neural network, and determining that an identifier of a transmitter is spoofed or not spoofed based on the predicted value and one or more criteria.

In various embodiments of at least the fifth, sixth, seventh, eighth, ninth and tenth methods, the channel characteristics may include any of an estimated channel input response and an accumulation of estimated channel input response.

In various embodiments of at least the fifth, sixth, seventh, eighth, ninth and tenth methods, the methods may include obtaining the trained neural network model. The methods, for example, may include selecting the trained neural network model from a repository, wherein the trained neural network model is selected based on the statistical description. Alternatively, the methods may include determining (generating) the trained neural network model based on the statistical description.

In various embodiments, determining (generating) the trained neural network model may include augmenting one or more samples of one or more RF signals based on one or more signal impairments, and/or training any of an untrained neural network and a partially trained neural network using the augmented samples. In various embodiments, the signal impairments may be or include any of one or more signal impairments other than those associated or attributed to a transmitter, one or more signal impairments that occur after transmission, and one or more propagation characteristics typical of a channel between a transmitter and a receiver.

In various embodiments, augmenting the samples of the RF signals may include augmenting the samples using one or more transforms that mimic the signal impairments. In various embodiments of at least the fifth, sixth, seventh, eighth, ninth and tenth methods, the methods may include the methods may include any of generating the transforms based on the signal impairments and applying the transforms to the samples.

In various embodiments, determining (generating) the trained neural network model may include augmenting one or more samples of one or more RF signals based on one or more propagation characteristics typical of a channel between a transmitter and a receiver, and training any of an untrained neural network and a partially trained neural network using the augmented samples.

In various embodiments, augmenting the samples of the RF signals may include augmenting the samples using one or more transforms that mimic the propagation characteristics. In various embodiments, the methods may include generating the transforms based on the propagation characteristics, and/or applying the transforms to the samples.

In various embodiments, at least one of the transforms mimics a realistic channel impulse response. In various embodiments, at least one of the transforms may be (or include) a FIR filter. In various embodiments, at least one of the transforms mimics a realistic channel frequency spectrum. In various embodiments, at least one of the transforms may be (or include) a frequency domain filter. In various embodiments, at least one of the transforms mimics a realistic channel frequency spectrum, and applying the transforms to the samples may include performing element-wise multiplication of the samples with filter coefficients of the filter in the frequency domain.

In various embodiments of at least the fifth, sixth, seventh, eighth, ninth and tenth methods, the methods may include saving the trained neural network as a neural network model. In various embodiments of at least the fifth, sixth, seventh, eighth, ninth and tenth methods, the methods may include labeling the trained neural network. In various embodiments, labeling the trained neural network may include labeling the trained neural network based on any of a characteristic of a network in which the transmitter is deployed and a characteristic of an environment in which the transmitter is deployed. In various embodiments of at least the fifth, sixth, seventh, eighth, ninth and tenth methods, the methods may include saving the labeled, trained neural network as a neural network model.

Among the procedures, methods, architectures, apparatuses, systems, devices, and computer program products is an apparatus that may include any of a transmitter, a receiver, a processor and memory, configured to perform a method as in at least one of the preceding methods.

In various embodiments, the apparatus may be, may be configured as and/or configured with elements of, a wireless transmit/receive unit (WTRU). In various embodiments, the apparatus may be, may be configured as and/or configured with elements of, a network element. In various embodiments, the network element may be a base station.

Among the procedures, methods, architectures, apparatuses, systems, devices, and computer program products is an eleventh method that may be implemented in a first device and that include any of: receiving, from a second device one of more of (i) one or more channel characteristics of a channel between a transmitter of a third device and a receiver of the second device, and (ii) a statistical description of the channel between the transmitter and the receiver; analyzing the one of more of (i) the channel characteristics and (ii) the statistical description; selecting, from a repository, a trained neural network model or a partially trained neural network model based on the analysis; and transmitting the trained neural network model to the second device.

Among the procedures, methods, architectures, apparatuses, systems, devices, and computer program products is a twelfth method that may be implemented in a first device and that include any of: receive, from a second device, one of more of (i) one or more channel characteristics of a channel between a transmitter of a third device and a receiver of the second device, and (ii) a statistical description of the channel between the transmitter and the receiver; training any of an untrained neural network model and a partially trained neural network model based on (i) the channel characteristics and (ii) the statistical description; and transmitting the trained neural network model to the second device.

In various embodiments of at least the eleventh and twelfth methods, the methods may include storing the trained neural network model in a repository. In various embodiments, the repository may be (or include) any of a database and a data store. In various embodiments of at least the eleventh and twelfth methods, the first device is, is configured as and/or configured with elements of, a server. In various embodiments of at least the eleventh and twelfth methods, at least one of the second and third devices is, is configured as and/or configured with elements of, a WTRU. In various embodiments of at least the eleventh and twelfth methods, at least one of the second and third devices is, is configured as and/or configured with elements of, a network element. In various embodiments, the network element is a base station.

The solutions to the problems described are based RF data augmentation. Pursuant to RF data augmentation, transforms may be applied to collected RF signals, where such transforms may mimic impairments not associated with the transmitter. For example, the distortion caused by the multi-path channel (which is not an impairment of the transmitter) may be implemented as a random realization of FIR filter drawn from a distribution typical of multipath channels in cellular systems. More details for each of several different augmentation transforms and related techniques are provided below.

The neural network discussed below may be, or may include, any of an N-class classifier and a binary spoofing detector classifier. Details of an example binary spoofing detector classifier may be found in international application no. PCT/US2022/18865, entitled "Methods, Architectures, Apparatuses and Systems directed to Zero-Touch Determination of Authenticity of Radios in a Network", filed 4 Mar. 2022, which claims the benefit of U.S. Provisional Patent Application No. 63/156,815 filed 4 Mar. 2021; each of which is incorporated herein by reference.

Example Data Augmentation

Samples of one or more RF signals transmitted via one or more wireless and/or wired communication links may be collected. The samples ("RF data") may be stored in a repository as a limited dataset. As used herein, a dataset is a "limited dataset" if any RF data therein is from RF signals that have not experienced a variety (e.g., a wide variety) of channels. The limited dataset may be read from the repository, and may be augmented (e.g., during training of a neural network) based on one or more signal impairments. For example, the limited dataset may be augmented (e.g., during training) using one or more transforms that mimic the signal impairments. The augmented RF data may be used to train a neural network configured for RFFP classification and/or spoofing detection ("RFFP neural network").

The signal impairments may be, e.g., signal impairments other than those associated or attributed to a transmitter (e.g., a particular transmitter), signal impairments that occur after transmission, one or more propagation characteristics typical of a link between a transmitter and a receiver, etc. The transforms may be generated based on various models and/or measurements corresponding to one or more of the signal impairments. The various models and/or measurements corresponding to one or more of the signal impairments may be used to generate one or more types of auxiliary data. The auxiliary data may be used as auxiliary inputs to the RFFP neural network during training and deployment. An RFFP neural network trained with augmented RF data and auxiliary data may be referred to herein as an extended RFFP neural network.

Figure 2:
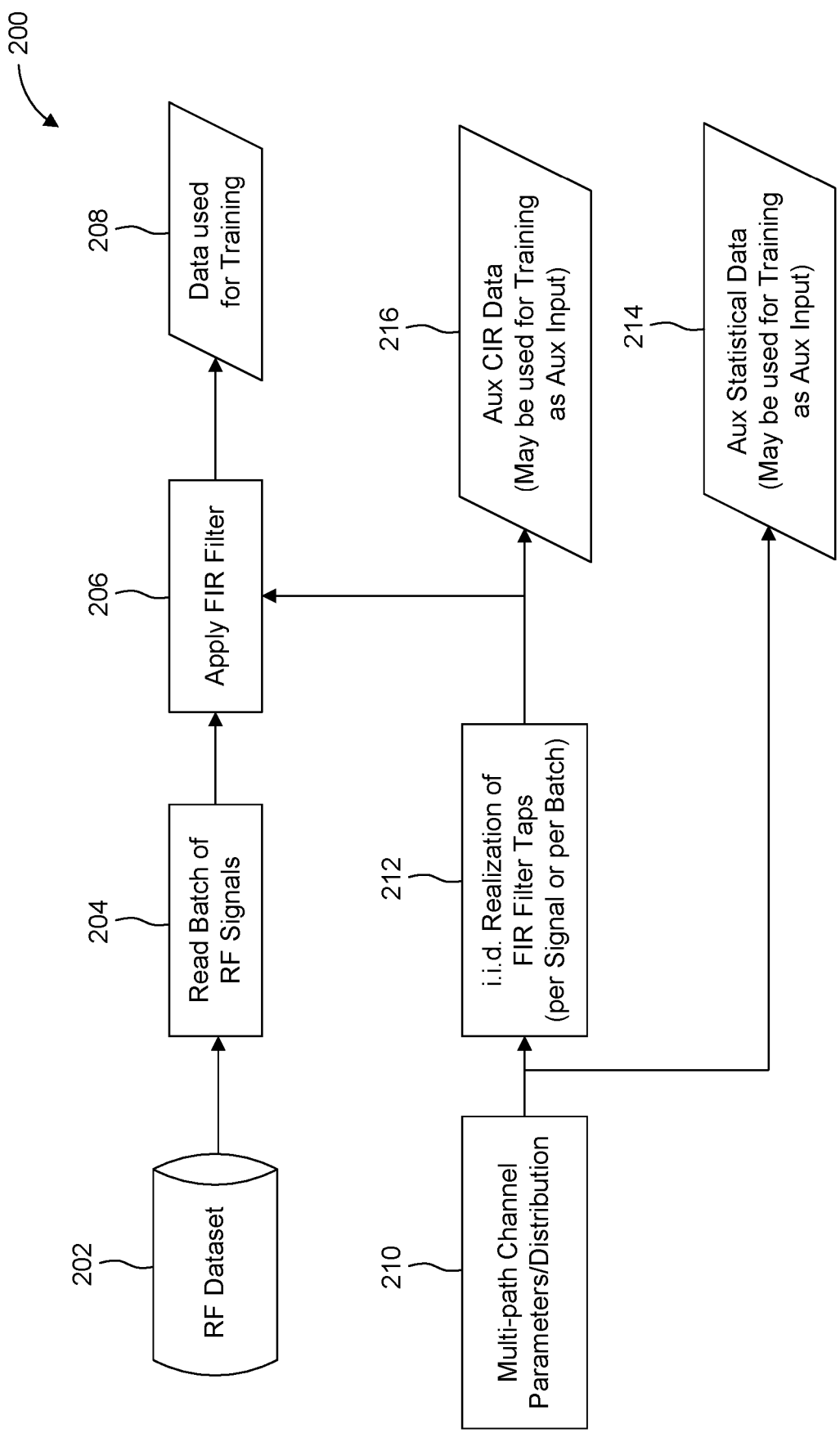
FIG. 2 illustrates example procedures for augmentation of radio frequency (RF) data and creation auxiliary data.

Representative Data Augmentations for Robustness to Multi-Path Channel Variations FIG. 2 illustrates example procedures 200 for augmentation of RF data and creation auxiliary data. The procedures 200 may be suitable for time-domain multi-path data augmentation of RF signals. Although the procedures 200 and accompanying disclosures are described based on time domain processing, the procedures 200 and accompanying disclosures may be adapted from time domain processing to frequency domain processing without undue experimentation.

Time-domain samples of one or more RF signals transmitted via one or more wireless and/or wired communication links may be collected and may be stored in a repository as a limited dataset (202). The limited dataset may be read from the repository (204), and may be augmented (e.g., before or during training) by FIR filtering of the data (206). The FIR filter may mimic a realistic channel impulse response. The augmented RF data may be used to train an RFFP neural network and/or an extended RFFP neural network.

Auxiliary data may be created. The auxiliary data may include any of a statistical description of a channel model (214) and a realized CIR of each channel (216). The auxiliary data may be input as auxiliary inputs to an extended RFFP neural network during training and deployment. The input size of the extended RFFP neural network may be, or be based on, a combined number of inputs for the augmented RF data and the auxiliary data, and/or a combined number of inputs for sampled RF signals and the auxiliary data (e.g., as deployed). If the same auxiliary data is available for a delayed model, it may be used to improve performance.

In various embodiments, frequency-domain samples of one or more RF signals transmitted via one or more wireless and/or wired communication links may be collected and may be stored in a repository as a limited dataset (202). The frequency-domain samples may be obtained by processing the RF signals (e.g., stored RF signals) using early stages of receiver processing. In various embodiments, the signals may be separated on a per user basis, e.g., for FDMA or OFDMA systems. Transmissions including multiple fields occupying different time, frequency, spatial, or code domain radio resources may be further separated or annotated; e.g., signals associated with DMRS may be of more importance, and/or may be separated, from other fields (not shown). The separation of the various components of the signals may be carried out after any of the procedures 202, 204, and 206 or within any of the procedures 202, 204, 206 and 208. The limited dataset may be read from the repository (204), and may be augmented (e.g., during training) by frequency domain filtering (e.g., element-wise multiplication of the data with filter coefficients of a frequency domain filter). The filter may mimic a realistic channel frequency spectrum.

Any of the filters (time domain and/or frequency domain) may be optimized (e.g., customized to be suitable) for typical channel statistics experienced at a particular site. For example, rural vs suburban vs urban regions produce statistically different channels. Transceivers at different heights produce statistically different channels. The statistics of each model used to train an RFFP neural network and/or information indicating the statistics may be used as a label (or name) of the trained RFFP neural network. The label (name) may be used to choose one or more appropriate models to be deployed. The label (name) may include, e.g., a multidimensional description of the channel statistics. The RFFP neural networks trained over multiple channel models may also be trained with the model descriptions (e.g., as auxiliary inputs). The FIR channels realized for augmentation may be used as inputs to an RFFP neural network. For example, if a CIR estimate is available, the FIR channels be used as an auxiliary input to the RFFP neural network when deployed.

In various embodiments, a WTRU, base station or other device having a transmitter, receiver, processor and/or memory (collectively a "TRU") may collect channel measurements and may create a statistical description of the channels experienced based on the channel measurements to use in connection with a deployed RFFP neural network.

Figure 3:
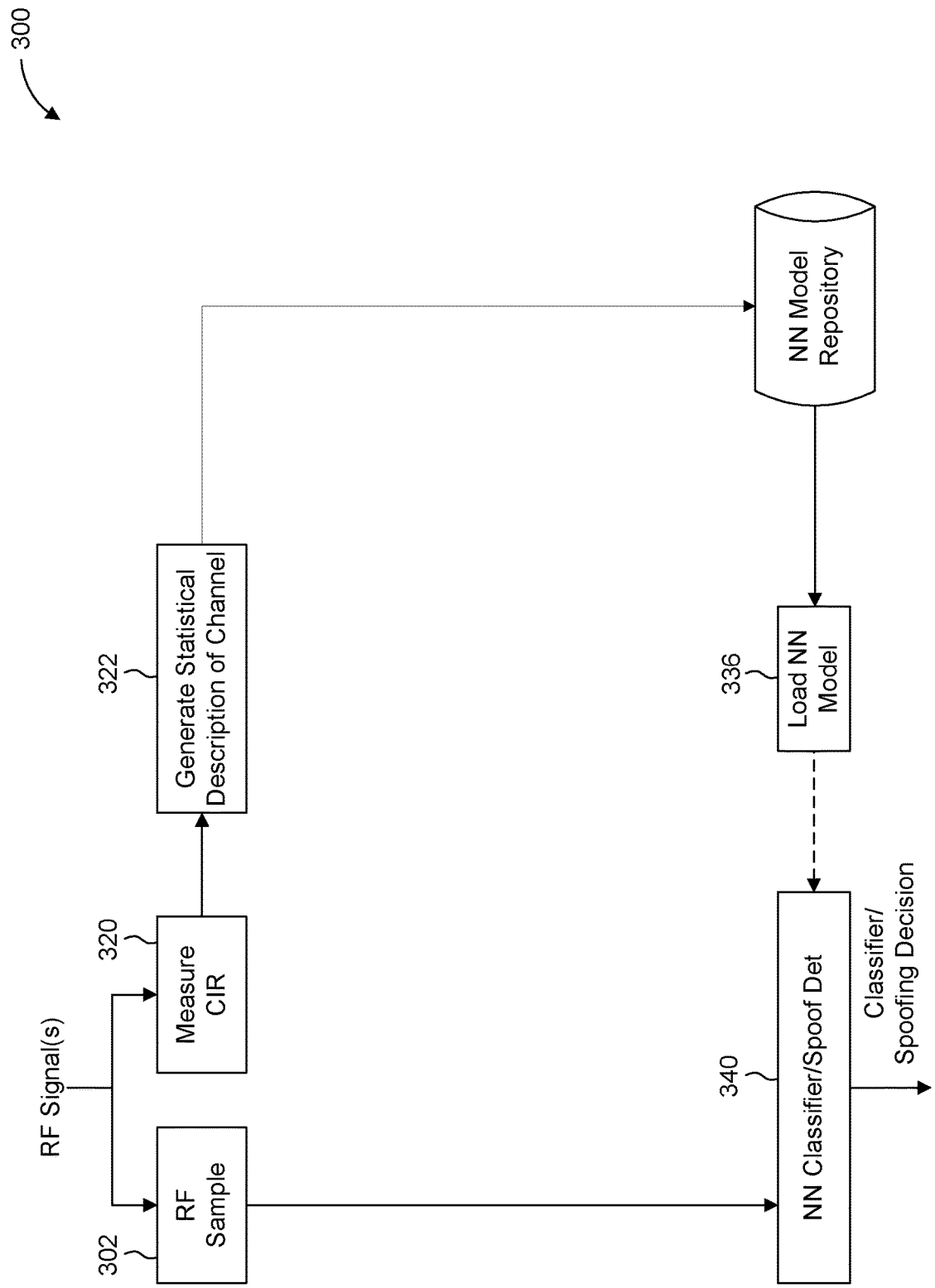
FIGS. 3-6 are flow charts illustrating example procedures for selecting, distributing and implementing RF fingerprinting (RFFP) neural networks trained with possibly site-specific augmented RF data.

FIG. 3 is a flow chart illustrating a flow 300 for implementing an RFFP neural network trained with augmented RF data (e.g., for improved performance and/or reduced overhead signaling). The flow 300 may be suitable in scenarios in which RF samples are used in the trained RFFP neural network input and CIR statistics are sent on a periodic basis to a repository (e.g., a network repository) of trained RFFP neural network models.

Referring to the FIG. 3, a TRU may obtain RF samples of an RF signal (302). The TRU may compute (i) an estimate of a CIR of a channel through which the RF signal transited ("current channel") and/or (ii) an accumulation of estimated CIRs ("accumulated CIR") of the channel (320). The TRU may determine a statistical description of the current channel based on (e.g., using) the estimated CIR and/or the accumulated CIR (322). The TRU may obtain an RFFP neural network model trained using RF data augmented for a channel commensurate with the statistical description from a repository (e.g., a local or a remote cache) (336). The TRU may obtain the RFFP neural network model, for example, by selecting from among multiple RFFP neural network models stored in the repository the RFFP neural network model trained using RF data augmented for a channel having a statistical description that may match (e.g., may best match), may be akin to, etc., the statistical description of the current channel. Alternatively, the TRU may obtain the RFFP neural network model by training a new RFFP neural network model using RF data augmented based on the statistical description of the current channel. An RFFP classifier or spoofing detector may be instantiated using the obtained neural network model (340). The obtained RF samples (320) may be input into the trained RFFP classifier or spoofing detector (340), and one or more predicted classifications or a spoofing decision for the RF samples may be output from the trained RFFP classifier or spoofing detector (340). The NN models in the NN model repository may be precomputed where some (e.g., each) of the NN models may be augmented using channel models of different statistical descriptions.

Figure 4:
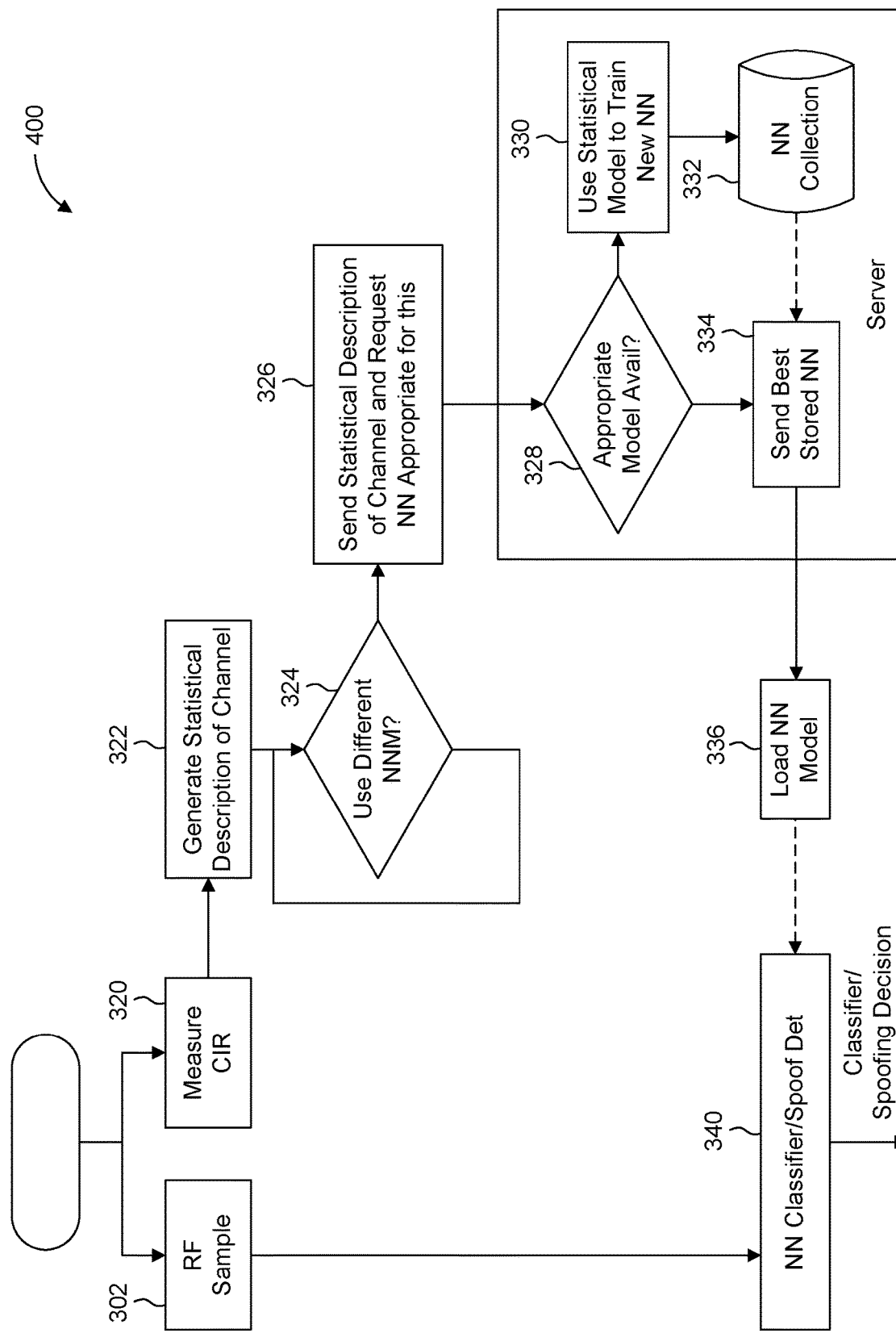

FIG. 4 is a flow chart illustrating a flow 400 for implementing an RFFP neural network trained with augmented RF data (e.g., for improved performance and/or reduced overhead signaling). The flow 400 is similar to the flow 300 of FIG. 3, except as described herein. The flow 400 may be suitable in scenarios in which prediction (scoring) performance of the trained RFFP neural network node that is currently deployed might degrade due to a change in the channel.

As shown in FIG. 4 (and implicit in the flow 300 of FIG. 3), the TRU may use the statistical description of the current channel to determine whether to use a different RFFP neural network model (324). The decision may be based on a change (e.g., a non-trivial change) in the statistical description of the current channel. For example, if the statistical description of the current channel no longer commensurate with (e.g., lacks good correlation with) the statistical description of the channel applicable to augmented RF data, the TRU may decide to update to a different RFFP neural network model that was trained with RF data augmented for another channel commensurate with the changed statistical description. As disclosed herein, the RFFP neural network models may be labeled (named) with respective statistical descriptions of the applicable channel models. The labels may be used to select (e.g., obtain from the repository) the RFFP neural network model trained using RF data augmented for a channel commensurate with the changed statistical description.

Also shown in FIG. 4 (and implicit in the flow 300 of FIG. 3), if a decision is made to use a different RFFP neural network model, the TRU may send the statistical description and/or information indicating the statistical description to a server (e.g., an application-as-a-service (AaaS) server) (326). The server may return the RFFP neural network model trained using RF data augmented for a channel having a statistical description that may match (e.g., may best match), may be akin to, etc., the statistical description of the current channel (334), (328). Alternatively, the server may train a new RFFP neural network model using RF data augmented based on the statistical description of the current channel and return that RFFP neural network model (330), (328). The RFFP neural network model may be received from the server (336). The RFFP classifier or spoofing detector may be instantiated using the received RFFP neural network model (340).

In various embodiments, multiple RFFP neural network models may be trained using multiple channel models with different statistical descriptions. The RFFP neural network models may be saved in a repository (e.g., a server/database). The TRU may send a statistical description of the channel (e.g., in standardized format) to a server/database. The server/database may analyze the statistical description, select an RFFP neural network model in its database that is appropriate (e.g., most appropriate) for the statistical description, and send the selected neural network model to the TRU. Alternatively, the server/database may analyze the statistical description, train an RFFP neural network model based on the statistical description, and send that neural network model to the TRU. The server/database may save the trained RFFP neural network model in the repository.

In various embodiments, an extended RFFP neural network may be trained using multiple channel models with different statistical descriptions, e.g., power-delay profile. The statistical descriptions, or a function of the statistical description may be used as auxiliary inputs to the extended RFFP neural network during training. The TRU may instantiate/deploy the trained extended RFFP neural network. The TRU may determine a statistical description of its experienced channels, and may use the statistical description as an auxiliary input to the extended RFFP neural network.

In various embodiments, an extended RFFP neural network may be trained using multiple channel models with different statistical descriptions. The realized channel (e.g., channel impulse response), or a function of the realized channel may be used as auxiliary inputs to the extended RFFP neural network during training. The TRU may instantiate/deploy the extended RFFP neural network and/or may obtain an appropriate one on request. For each packet to be analyzed for RFFP, the TRU may estimate the channel and may use the estimated channel as an auxiliary input to the NN.

In various embodiments, multiple partially generalized, extended RFFP neural network models may be trained using multiple channel models with different statistical descriptions and may be saved in server/database. The realized channel (e.g., channel impulse response), or a function of the realized channel, may be used as auxiliary inputs to each of the multiple partially generalized, extended RFFP neural network models during training. The TRU may send a statistical description of the channel (e.g., in standardized format) to a server/database. The server/database may analyze the statistical description, select an extended RFFP neural network model in its database that may be appropriate (e.g., most appropriate) for the statistical description, and may send the selected model to the TRU. Alternatively, the server/database may analyze the statistical description, train an extended RFFP neural network model based on the statistical description, and send that extended RFFP neural network model to the TRU. For each packet to be analyzed for RFFP, the TRU may estimate the channel and the estimated channel may be used as an auxiliary input to the NN.

Figure 5:
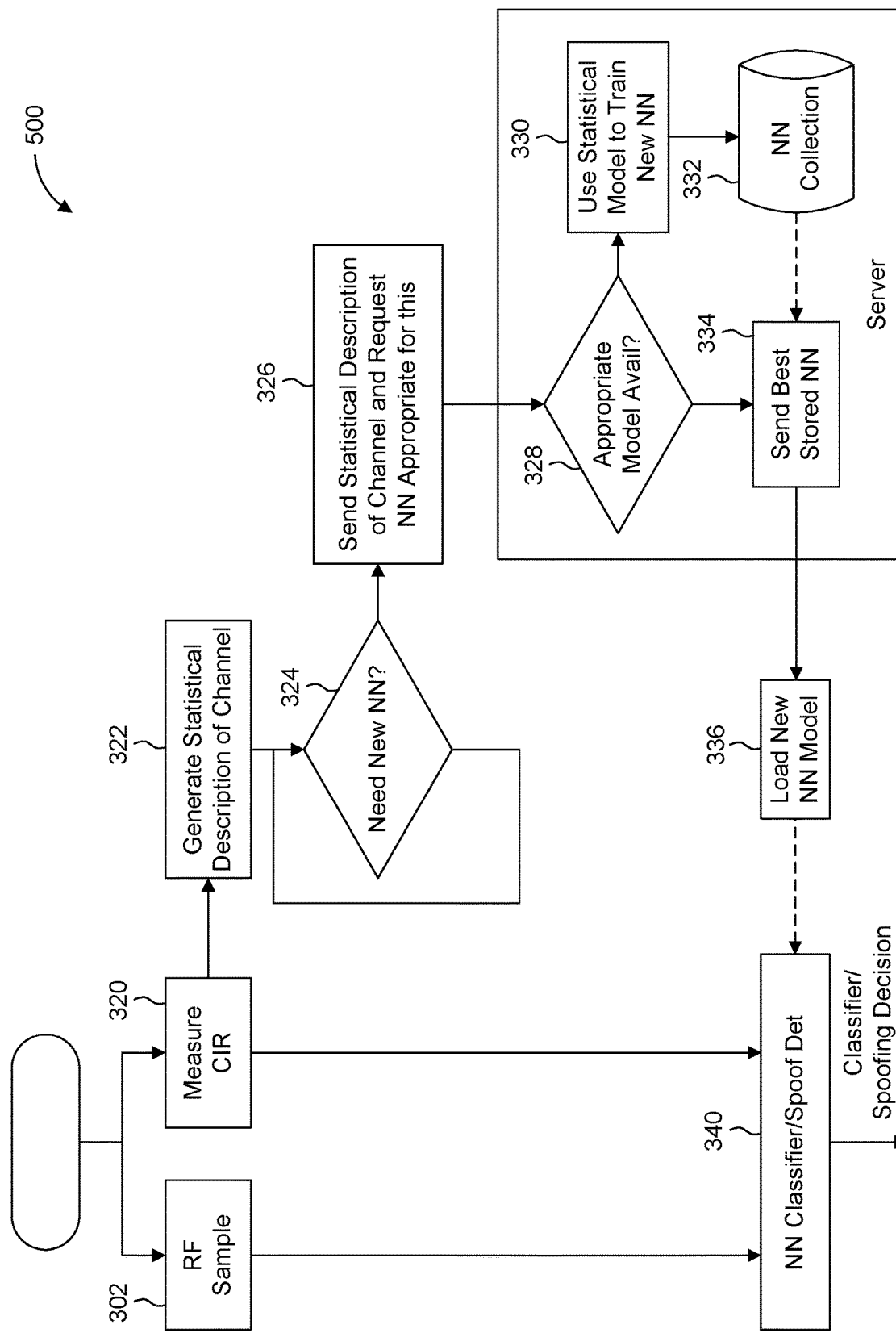

FIG. 5 is a flow chart illustrating a flow 500 for implementing an RFFP neural network trained with augmented RF data (e.g., for improved performance and/or reduced overhead signaling). The flow 500 is similar to the flows 300, 400 of FIGS. 3 and 4, except as described herein. The flow 500 may be suitable in in which RF samples and CIR estimates are used in the trained and/or deployed RFFP neural network input.

The RFFP classifier or spoofing detector may be instantiated using an extended RFFP neural network model (340). The obtained RF samples (320) and the estimated CIR and/or the accumulated CIR may be input into the trained RFFP classifier or spoofing detector (340), and one or more predicted classifications or a spoofing decision for the RF samples may be output from the trained RFFP classifier or spoofing detector (340).

Figure 6:
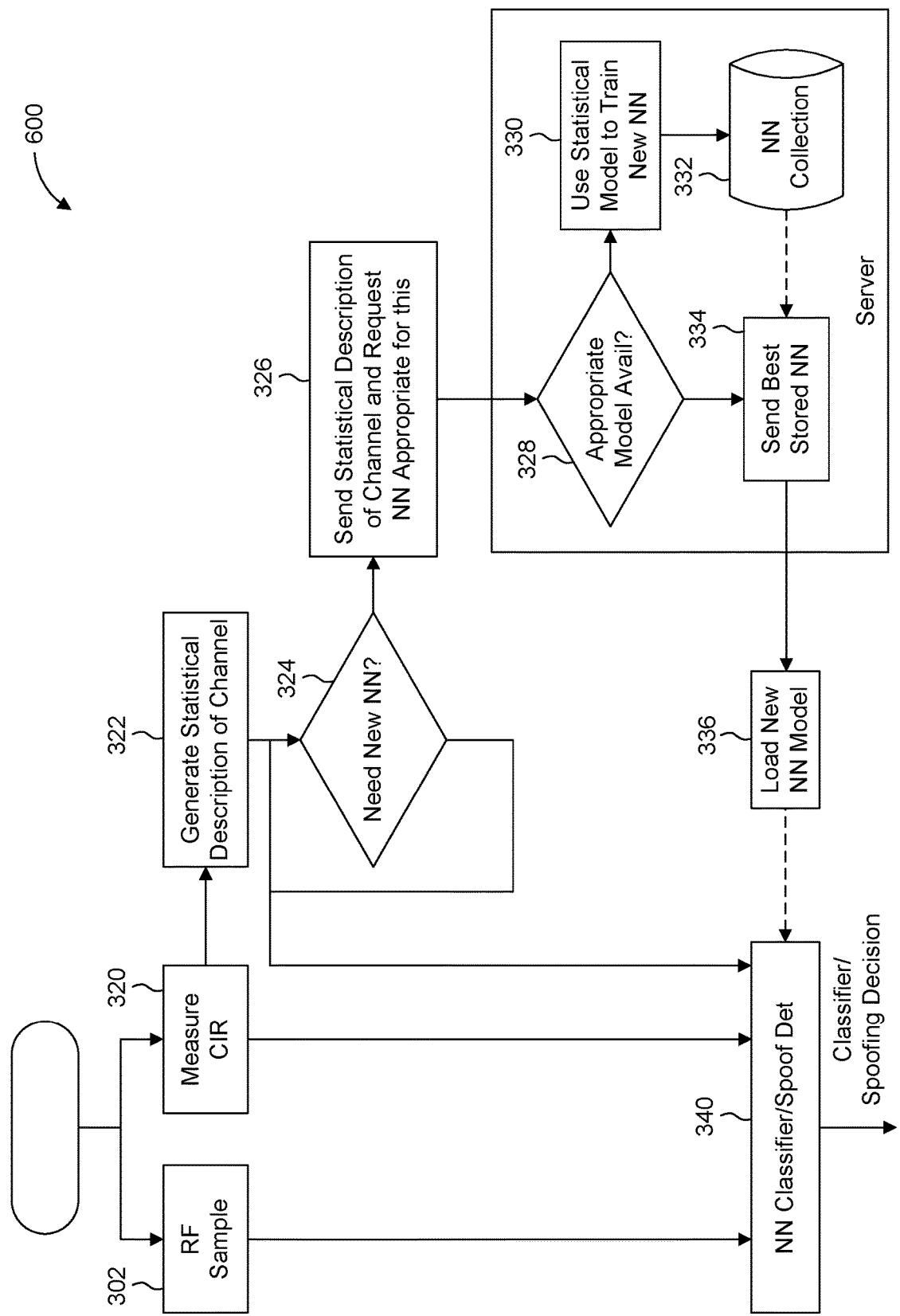

FIG. 6 is a flow chart illustrating a flow 600 for implementing an RFFP neural network trained with augmented RF data (e.g., for improved performance and/or reduced overhead signaling). The flow 600 is similar to the flow 500 of FIG. 5, except as described herein. The flow 600 may be suitable in scenarios in which RF samples, CIR estimates and statistics created from CIR measurements are used in the trained RFFP neural network input.

The obtained RF samples (320), the statistical description and the estimated CIR and/or the accumulated CIR may be input into the trained RFFP classifier or spoofing detector (340), and one or more predicted classifications or a spoofing decision for the RF samples may be output from the trained RFFP classifier or spoofing detector (340).

Representative Augmentations for Robustness to CFO Drift

In some cases, it may be desirable to avoid learning to fingerprint radios based on CFO. One method may be to augment the limited dataset and/or an already augmented dataset in such a way that the apparent CFO varies during training. Any of the disclosed RFFP neural networks and/or extended RFFP neural networks may be extended for robustness to CFO. Extending the disclosed RFFP neural networks and/or extended RFFP neural networks may include further augmenting an already augmented dataset. In various embodiments, the limited dataset may be augmented (e.g., during training) by element-wise multiplication of the time domain signal with a rotating phasor (a unit magnitude complex number with time-varying phase) that introduces an apparent change in CFO. In various embodiments, the limited dataset may be augmented (e.g., before or during training) by interpolated shifting of the frequency domain signal according to a desired difference in CFO, which introduces an apparent change in CFO.

The additional CFO error (rate of change of phase) added in the augmentation may be independent and identically distributed (i.i.d.), and may be drawn from a distribution representative of CFO drift. Time correlation may be removed (e.g., intentionally removed) for the CFO error model to improve learning.

Representative Augmentations for Accommodating CFO Drift as a Feature

Steps may be taken to enable the use of CFO as a feature. CFO may be a comparatively slow changing process. CFO is known to be sensitive to certain external conditions, e.g., temperature.

In various embodiments, established models for CFO drift over time may be used to augment the limited dataset and/or an already augmented dataset with time correlated CFO errors, e.g., the added CFO error applied to data from radio X at time $t=T+dT$, is correlated to the added CFO error applied to data from radio X at time $t=T$. An extended RFFP neural network may be trained so that it accommodates CFO drift (e.g., so that it becomes insensitive (e.g., largely insensitive) to changes in CFO). During training, samples or statistics collected at T, T+dT, or both for a given radio X may be used as auxiliary input to the extended RFFP neural network model. The data input to the extended RFFP neural network for radio X at time T is saved. When radio X data is used as input to the extended RFFP neural network at time T+dT, the saved radio X data (or function of it) may be used as auxiliary input to the extended RFFP neural network model. Multiple saved inputs may be used. CFO error may be estimated by the receiving device for radio X and may be used as auxiliary input to the NN model. Multiple saved CFO error estimates may be used.

In various embodiments, the extended RFFP neural network may be further extended to incorporate other auxiliary data including any of (i) measured temperature at the receiving device, (ii) temperature measurements made by and/or reported by the transmitting device, (iii) temperature measurements made by and/or reported by other devices in the vicinity of the transmitting devices, and (iv) temperature estimates of the transmitting device based on a combination of measurements, reports, and/or historical data. Established models for CFO drift over temperature may be used to augment the limited dataset and/or an already augmented dataset with temperature correlated CFO errors, e.g., the added CFO error applied to data from radio X at temperature temp at transmission K+1, may be correlated to the added CFO error applied to data from radio X at transmission K. Multiple saved temperature estimates may be used.

Any of the disclosed RFFP neural networks and/or extended RFFP neural networks may be used in conjunction with (e.g., combined with) the extended RFFP neural networks that accommodate CFO drift as a feature.

Representative Augmentations for Interference Robustness and Prediction Confidence Training the network with typical interference to improve robustness to interference may be provided.

The limited dataset may be augmented (e.g., during training) by element-wise addition of interference signals to the signal read from the limited dataset. The interference signal may be generated from an internal process (deterministic or stochastic) and/or may be drawn from a database of signals used to model interference. The database may be, for example, a separately generated dataset, the same dataset as the desired signal database, etc. A variety of typical traffic models may be used to decide when and with how much power the interference is applied in the transform. An extended RFFP neural network may be trained with various amount, type, and frequency of interference bursts (a benefit of which may be to make it more robust to interference).

The interference model may be optimized for the typical interference statistics experienced for a particular site and time-of-day/day-of-week. In various embodiments, a TRU may collect interference measurements and/or may create a statistical description of the interference experienced, possibly on a per time-of-day/day-of-week basis use in connection with a deployed RFFP neural network.

In various embodiments, multiple RFFP neural networks models may be trained using multiple interference models with different statistical descriptions. The RFFP neural networks models may be saved in a server/database. The TRU may send a statistical description of the interference (e.g., in a standardized format) to the server/database. The server/database may analyze the statistical description of interference, select an RFFP neural network model in its database that may be appropriate (e.g., most appropriate) for the statistical description, and send the selected RFFP neural network model to the TRU. Alternatively, the server/database may analyze the statistical description, train an RFFP neural networks model based on the statistical description, and send that RFFP neural network model to the TRU.

In various embodiments, an extended RFFP neural network model may be trained using multiple interference models with different statistical descriptions, e.g., burst length, frequency, and power distribution. The statistical descriptions of interference, or a function of the statistical description, may be used as auxiliary inputs to the extended RFFP neural network during training. The TRU may instantiate/deploy the extended RFFP neural network model. After the TRU determines the statistical description of its current interference, it may be used as the auxiliary input to the trained extended RFFP neural networks.

In various embodiments, an extended RFFP neural network model may be trained using multiple interference models with different statistical descriptions. The realized interference (e.g., a particular burst length, start/stop time, power), or a function of the measured interference, may be used as auxiliary inputs to the extended RFFP neural network during training. The TRU may instantiate/deploy the extended RFFP neural network. For each packet to be analyzed for RFFP, the TRU may estimate interference parameters for that packet and they may be used as an auxiliary input to the extended RFFP neural network.

In various embodiments, multiple partially generalized extended RFFP neural network models may be trained using multiple interference models with different statistical descriptions. The multiple partially generalized extended RFFP neural network models may be saved in a server/database. The realized interference (e.g., a particular burst length, start/stop time, power), or a function of the realized interference, may be used as auxiliary inputs to each of the multiple partially generalized extended RFFP neural networks during training. The TRU may send a statistical description of the channel (e.g., in standardized format) to the server/database. The server/database may analyze the statistical description, select one of the multiple partially generalized extended RFFP neural network models in its database that is appropriate (e.g., most appropriate) for the statistical description, and send the selected partially generalized extended RFFP neural network model to the TRU. Alternatively, the server/database may analyze the statistical description, train a partially generalized extended RFFP neural network model based on the statistical description, and send that partially generalized extended RFFP neural network model to the TRU. For each packet to be analyzed for RFFP, the TRU may estimate the interference parameters and they may be used as the auxiliary input to the NN.

The above embodiments may be further enhanced by extending the RFFP neural network and/or extended RFFP neural networks to provide an additional secondary output that indicates the presence of interference that degrades the RFFP performance. Alternatively, a separate RFFP neural network may be used to provide a secondary output that indicates the presence of interference that degrades the RFFP performance. In this way, any preexisting RFFP neural network does not need to be altered. The secondary RFFP neural network may include inputs taken from the internal signals within the preexisting RFFP neural network. For example, a more positive output would indicate that interference likely caused a incorrect prediction. During training, the secondary output may be trained as a binary classifier. The desired output may be True if the primary classifier is wrong and there is interference. When deployed, the secondary output may be used as an indicator to higher layer filtering that less weight should be given to the classifier outputs that are likely degraded by interference.

Representative Performance

A simulation was carried out to evaluate the performance of RF data augmentation in accordance with embodiments disclosed herein Over-the-air transmissions from 48 Pycom FiPy LoRa IoT radios were collected with an Ettus E310 SDR radio. The goal is to train a NN with data that was captured in an environment having a limited amount of channel multi-path variation (e.g., a single location at a particular time of day), but still have good performance when radios are deployed in a scenario that the multi-path channel is substantially different than the one used to create the training data.

Two neural networks having the same architecture were created to classify the RF samples. The first was trained using an un-augmented dataset (i.e., without any transforms being applied to the limited dataset), and the second was trained using the limited dataset that was augmented using a random FIR transform. Each FIR realization had six taps with random delay, amplitude, and phase. Each neural network was tested with two different datasets: one with no transform applied and one with a fixed filter having a delay spread that is included in the range of delay spreads in the random FIR used during training. The training and test accuracy and loss were recorded for each.

Table 1 lists the result of the simulation. The first neural network (i.e., the one trained without the RF data augmentation) was 92% accurate when classifying untransformed data, but it was only 20% accurate when classifying the transformed dataset. However, the second neural network (i.e., the one trained with the limited dataset augmented using the FIR transform) was approximately 88% accurate with both untransformed and augmented data. Compared with the first neural network, the accuracy of the second neural network is lower by 4%, when testing with untransformed data, but higher by 68% when testing with transformed data, illustrating that an RFFP neural network trained with RF data augmented by the FIR transform provided a large improvement in robustness with a small cost in performance. Further, the simulation highlights the benefit of using a random FIR filter transform to augment the limited dataset (emulating multi-path fading) in the case that the training data was collected through a propagation channel that is different than in testing.

TABLE 1

Results of training neural networks with and without the FIR filter transforms

| Neural Network | Test data FIR | Test Accuracy | Test Loss | Train Accuracy | Train Loss |
| --- | --- | --- | --- | --- | --- |
| Trained without FIR | None | 91.89 | 0.3592 | 91.89 | 0.2758 |

TABLE 1-continued

Results of training neural networks with
and without the FIR filter transforms

| Neural Network | Test data FIR | Test Accuracy | Test Loss | Train Accuracy | Train Loss |
|---|---|---|---|---|---|
| Trained without FIR | Saved fixed FIR | 19.63 | 6.6151 | 91.89 | 0.2758 |
| Trained with FIR | None | 87.62 | 0.4412 | 83.84 | 0.5431 |
| Trained with FIR | Saved fixed FIR | 87.86 | 0.4471 | 83.84 | 0.5431 |

Figures 7, 8:
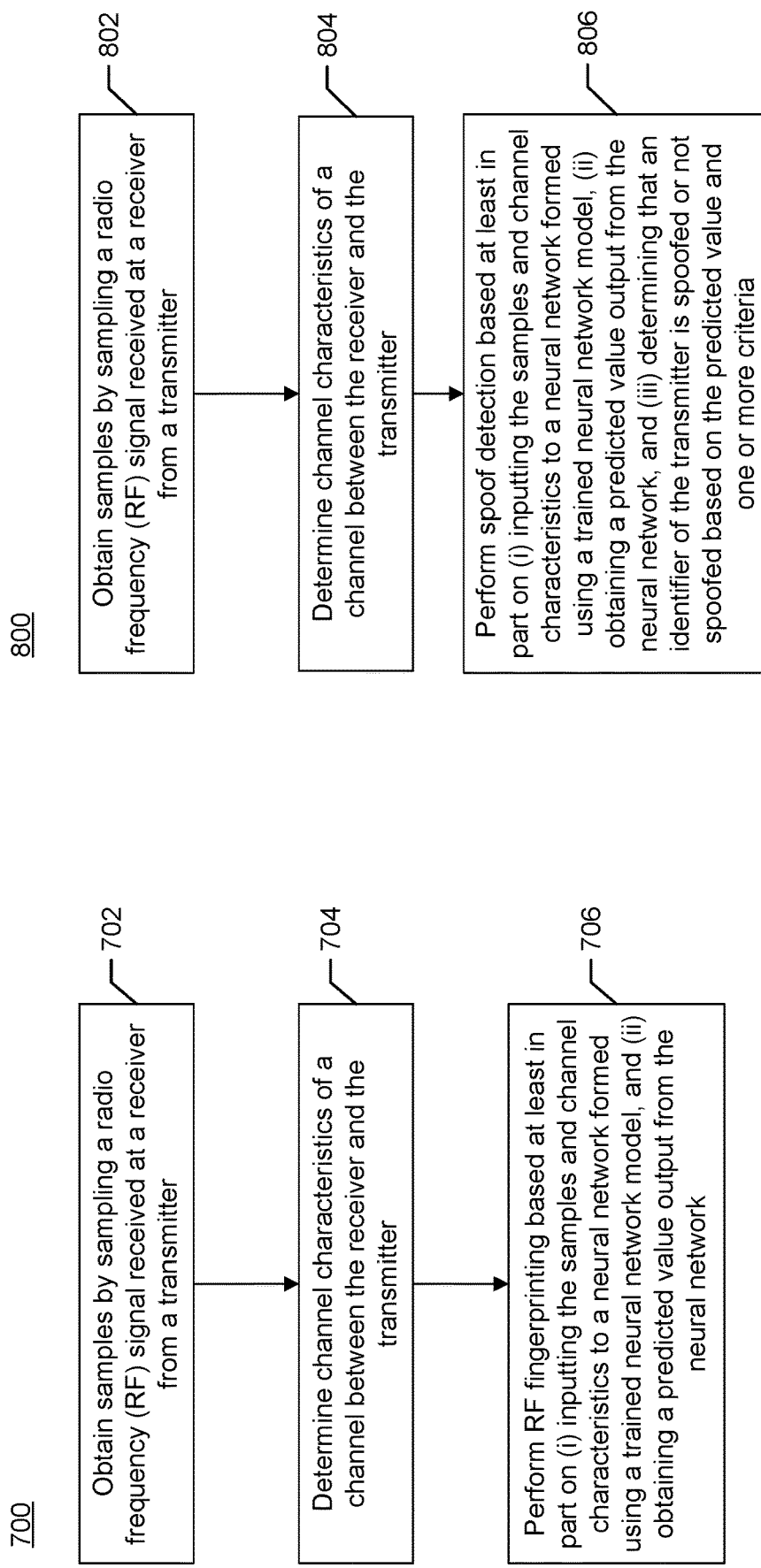

FIG. 7 is a flow chart illustrating an example flow 700 in accordance with various embodiments. For convenience and simplicity of exposition, the flow 700 and accompanying disclosures herein are described with reference to the architectures of the communications system 100 (FIG. 1). The flow 700 may be carried out using different architectures as well.

Referring now to FIG. 7, a receiver (e.g., a WTRU, a base station, etc.) may obtain one or more samples by sampling an RF signal received (e.g., received at the receiver) from a transmitter (e.g., a base station, a WTRU, etc.) (702). The receiver may determine one or more channel characteristics of a channel between the receiver and the transmitter (704). The channel characteristics may include any of an estimated channel input response and an accumulation of estimated channel input response. The receiver may perform RF fingerprinting based at least in part on (i) inputting the samples and the channel characteristics (as inputs) to a neural network formed using a trained neural network model, and (ii) obtaining a predicted value output from the neural network (706).

In various embodiments, the receiver may input one or more statistical channel descriptions to the neural network in connection with performing RF fingerprinting (not shown). In various embodiments, the receiver may determine a statistical description of the channel based at least in part on the channel characteristics, and/or may obtain the trained neural network model based on the statistical description of the channel. In various embodiments, the receiver may obtain the trained neural network model at least in part by selecting the trained neural network model from a repository based on the statistical description. In various embodiments, the receiver may obtain the trained neural network model at least in part by determining (generating) the trained neural network model based on the statistical description.

In various embodiments, the receiver may determine (generate) the trained neural network model based at least in part on augmenting one or more samples of one or more RF signals based on one or more signal impairments, and/or training an untrained neural network or a partially trained neural network using the augmented second samples. In various embodiments, the impairments may include any of (i) one or more signal impairments other than those associated or attributed to a transmitter, (ii) one or more signal impairments that occur after transmission, and (iii) one or more propagation characteristics typical of a channel between a transmitter and a receiver. In various embodiments, the receiver may augment the samples of the RF signals using one or more transforms that mimic the one or more signal impairments. In various embodiments, the receiver may generate the transforms based on the signal impairments, and/or may augment the samples at least in part by applying the transforms to the samples.

In various embodiments, the receiver may determine (generate) the trained neural network model based at least in part on augmenting one or more samples of one or more RF signals based on one or more propagation characteristics typical of a channel between a transmitter and a receiver, and/or training an untrained neural network or a partially trained neural network using the augmented samples. In various embodiments, the receiver may augment the samples of the RF signals at least in part by augmenting the samples using one or more transforms that mimic the propagation characteristics. In various embodiments, the receiver may generate the transforms based on the propagation characteristics, and/or may augment the samples at least in part by applying the transforms to the samples. In various embodiments, one or more of the transforms may mimic a realistic channel impulse response. In various embodiments, one or more of the transforms may be FIR filters.

In various embodiments, one or more of the transforms may mimics a realistic channel frequency spectrum. In various embodiments, one or more of the transforms may be a frequency domain filter. In various embodiments, the receiver may perform element-wise multiplication of the one or more second samples with filter coefficients of the filter in the frequency domain.

In various embodiments, the receiver may save the trained neural network as a neural network model. In various embodiments, the receiver may label the trained neural network. For example, the receiver may label the trained neural network based on any of a characteristic of a network in which the transmitter is deployed and a characteristic of an environment in which the transmitter is deployed. In various embodiments, the receiver may save the labeled, trained neural network as a neural network model.

FIG. 8 is a flow chart illustrating an example flow 800 in accordance with various embodiments. For convenience and simplicity of exposition, the flow 800 and accompanying disclosures herein are described with reference to the architectures of the communications system 100 (FIG. 1). The flow 800 may be carried out using different architectures as well.

Referring now to FIG. 8, a receiver (e.g., a WTRU, a base station, etc.) may obtain one or more samples by sampling an RF signal received (e.g., received at the receiver) from a transmitter (e.g., a base station, a WTRU, etc.) (802). The receiver may determine one or more channel characteristics of a channel between the receiver and the transmitter (804). The channel characteristics may include any of an estimated channel input response and an accumulation of estimated channel input response. The receiver may perform spoof detection based at least in part on (i) inputting the samples and the channel characteristics to a neural network formed using a trained neural network model, (ii) obtaining a predicted value output from the neural network, and/or (iii) determining that an identifier of the transmitter is spoofed or not spoofed based on the predicted value and one or more criteria (806).

In various embodiments, the receiver may input one or more statistical channel descriptions to the neural network in connection with performing spoof detection (not shown). In various embodiments, the receiver may determine a statistical description of the channel based at least in part on the channel characteristics; and/or may obtain the trained neural network model based on the statistical description of the channel. In various embodiments, the receiver may obtain the trained neural network model at least in part by selecting the trained neural network model from a repository based on the statistical description. In various embodiments, the receiver may obtain the trained neural network model at least in part by determining (generating) the trained neural network model based on the statistical description.

In various embodiments, the receiver may determine (generate) the trained neural network model based at least in part on augmenting one or more samples of one or more RF signals based on one or more signal impairments, and/or training an untrained neural network or a partially trained neural network using the augmented second samples. In various embodiments, the impairments may include any of (i) one or more signal impairments other than those associated or attributed to a transmitter, (ii) one or more signal impairments that occur after transmission, and (iii) one or more propagation characteristics typical of a channel between a transmitter and a receiver. In various embodiments, the receiver may augment the samples of the RF signals using one or more transforms that mimic the one or more signal impairments. In various embodiments, the receiver may generate the transforms based on the signal impairments, and/or may augment the samples at least in part by applying the transforms to the samples.

In various embodiments, the receiver may determine (generate) the trained neural network model based at least in part on augmenting one or more samples of one or more RF signals based on one or more propagation characteristics typical of a channel between a transmitter and a receiver, and/or training an untrained neural network or a partially trained neural network using the augmented samples. In various embodiments, the receiver may augment the samples of the RF signals at least in part by augmenting the samples using one or more transforms that mimic the propagation characteristics. In various embodiments, the receiver may generate the transforms based on the propagation characteristics, and/or may augment the samples at least in part by applying the transforms to the samples. In various embodiments, one or more of the transforms may mimic a realistic channel impulse response. In various embodiments, one or more of the transforms may be FIR filters.

In various embodiments, one or more of the transforms may mimics a realistic channel frequency spectrum. In various embodiments, one or more of the transforms may be a frequency domain filter. In various embodiments, the receiver may perform element-wise multiplication of the one or more second samples with filter coefficients of the filter in the frequency domain.

In various embodiments, the receiver may save the trained neural network as a neural network model. In various embodiments, the receiver may label the trained neural network. For example, the receiver may label the trained neural network based on any of a characteristic of a network in which the transmitter is deployed and a characteristic of an environment in which the transmitter is deployed. In various embodiments, the receiver may save the labeled, trained neural network as a neural network model.

FIG. 9 is a flow chart illustrating an example flow 900 in accordance with various embodiments. For convenience and simplicity of exposition, the flow 900 and accompanying disclosures herein are described with reference to the architectures of the communications system 100 (FIG. 1). The flow 900 may be carried out using different architectures as well.

Referring now to FIG. 9, a device (e.g., a WTRU, a base station, etc.) may obtain one or more samples of an RF signal (902). The device may determine one or more channel characteristics of a first channel through which the RF signal transited (904). The channel characteristics may include any of an estimated channel input response and an accumulation of estimated channel input response. The device may determine a first statistical description of the first channel based on the channel characteristics (906). The device may deploy a neural network using a trained neural network model trained using RF data augmented based on a second channel having a second statistical description that at least in part corresponds to the first statistical description (908).

In various embodiments, the device may perform RF fingerprinting (not shown). For example, the device may perform RF fingerprinting based at least in part on inputting the samples and the first channel characteristics (as inputs) to the neural network, and/or obtaining a predicted value output from the neural network.

In various embodiments, the device may perform spoof detection (not shown). For example, the device may perform spoof detection based at least in part on (i) inputting the samples and the channel characteristics to a neural network formed using a trained neural network model, (ii) obtaining a predicted value output from the neural network, and/or (iii) determining that an identifier of a transmitter is spoofed or not spoofed based on the predicted value and one or more criteria.

In various embodiments, the device may obtain the trained neural network model (not shown). In various embodiments, the device may obtain the trained neural network model at least in part by selecting the trained neural network model from a repository based on the first statistical description. In various embodiments, the device may obtain the trained neural network model at least in part by determining (generating) the trained neural network model based on the second statistical description.

In various embodiments, the device may determine (generate) the trained neural network model based at least in part on augmenting one or more samples of one or more RF signals based on one or more signal impairments, and/or training an untrained neural network or a partially trained neural network using the augmented second samples. In various embodiments, the impairments may include any of (i) one or more signal impairments other than those associated or attributed to a transmitter, (ii) one or more signal impairments that occur after transmission, and (iii) one or more propagation characteristics typical of a channel between a transmitter and a receiver. In various embodiments, the device may augment the samples of the RF signals using one or more transforms that mimic the one or more signal impairments. In various embodiments, the device may generate the transforms based on the signal impairments, and/or may augment the samples at least in part by applying the transforms to the samples.

In various embodiments, the device may determine (generate) the trained neural network model based at least in part on augmenting one or more samples of one or more RF signals based on one or more propagation characteristics typical of a channel between a transmitter and a receiver, and/or training an untrained neural network or a partially trained neural network using the augmented samples. In various embodiments, the device may augment the samples of the RF signals at least in part by augmenting the samples using one or more transforms that mimic the propagation characteristics. In various embodiments, the device may generate the transforms based on the propagation characteristics, and/or may augment the samples at least in part by applying the transforms to the samples. In various embodiments, one or more of the transforms may mimic a realistic channel impulse response. In various embodiments, one or more of the transforms may be FIR filters.

In various embodiments, one or more of the transforms may mimics a realistic channel frequency spectrum. In various embodiments, one or more of the transforms may be a frequency domain filter. In various embodiments, the device may perform element-wise multiplication of the one or more second samples with filter coefficients of the filter in the frequency domain.

In various embodiments, the device may save the trained neural network as a neural network model. In various embodiments, the device may label the trained neural network. For example, the device may label the trained neural network based on any of a characteristic of a network in which the transmitter is deployed and a characteristic of an environment in which the transmitter is deployed. In various embodiments, the device may save the labeled, trained neural network as a neural network model.

Figure 10:
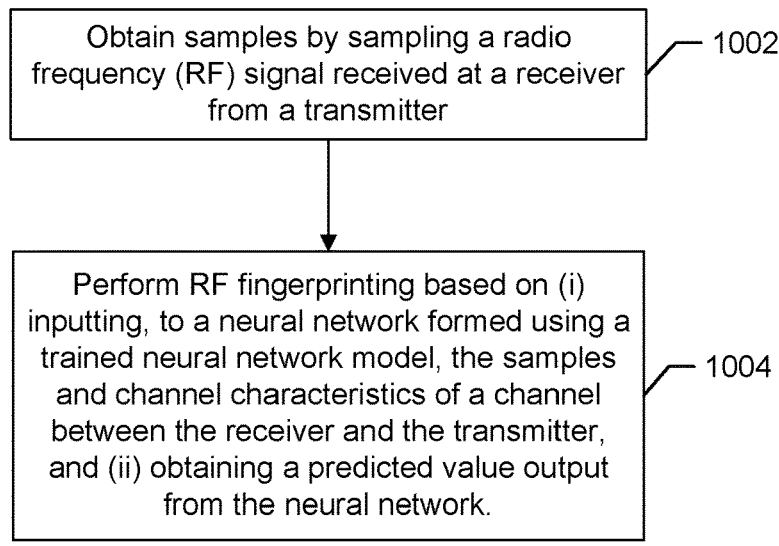

FIG. 10 is a flow chart illustrating an example flow 1000 in accordance with various embodiments. For convenience and simplicity of exposition, the flow 1000 and accompanying disclosures herein are described with reference to the architectures of the communications system 100 (FIG. 1). The flow 1000 may be carried out using different architectures as well.

Referring now to FIG. 10, a receiver (e.g., a WTRU, a base station, etc.) may obtain one or more samples by sampling an RF signal received (e.g., received at the receiver) from a transmitter (e.g., a base station, a WTRU, etc.) (1002). The receiver may perform RF fingerprinting based on (i) inputting the samples and one or more channel characteristics as inputs to a neural network formed using a trained neural network model and/or (ii) obtaining a predicted value output from the neural network (1004). The channel characteristics may include channel characteristics of the channel between the receiver and the transmitter. The channel characteristics may include any of an estimated channel input response and an accumulation of estimated channel input response.

In various embodiments, the receiver may input one or more statistical channel descriptions to the neural network in connection with performing RF fingerprinting (not shown). In various embodiments, the receiver may determine a statistical description of the channel based at least in part on the channel characteristics, and/or may obtain the trained neural network model based on the statistical description of the channel. In various embodiments, the receiver may obtain the trained neural network model at least in part by selecting the trained neural network model from a repository based on the statistical description. In various embodiments, the receiver may obtain the trained neural network model at least in part by determining (generating) the trained neural network model based on the statistical description.

In various embodiments, the receiver may determine (generate) the trained neural network model based at least in part on augmenting one or more samples of one or more RF signals based on one or more signal impairments, and/or training an untrained neural network or a partially trained neural network using the augmented second samples. In various embodiments, the impairments may include any of (i) one or more signal impairments other than those associated or attributed to a transmitter, (ii) one or more signal impairments that occur after transmission, and (iii) one or more propagation characteristics typical of a channel between a transmitter and a receiver. In various embodiments, the receiver may augment the samples of the RF signals using one or more transforms that mimic the one or more signal impairments. In various embodiments, the receiver may generate the transforms based on the signal impairments, and/or may augment the samples at least in part by applying the transforms to the samples.

In various embodiments, the receiver may determine (generate) the trained neural network model based at least in part on augmenting one or more samples of one or more RF signals based on one or more propagation characteristics typical of a channel between a transmitter and a receiver, and/or training an untrained neural network or a partially trained neural network using the augmented samples. In various embodiments, the receiver may augment the samples of the RF signals at least in part by augmenting the samples using one or more transforms that mimic the propagation characteristics. In various embodiments, the receiver may generate the transforms based on the propagation characteristics, and/or may augment the samples at least in part by applying the transforms to the samples. In various embodiments, one or more of the transforms may mimic a realistic channel impulse response. In various embodiments, one or more of the transforms may be FIR filters.

In various embodiments, one or more of the transforms may mimics a realistic channel frequency spectrum. In various embodiments, one or more of the transforms may be a frequency domain filter. In various embodiments, the receiver may perform element-wise multiplication of the one or more second samples with filter coefficients of the filter in the frequency domain.

In various embodiments, the receiver may save the trained neural network as a neural network model. In various embodiments, the receiver may label the trained neural network. For example, the receiver may label the trained neural network based on any of a characteristic of a network in which the transmitter is deployed and a characteristic of an environment in which the transmitter is deployed. In various embodiments, the receiver may save the labeled, trained neural network as a neural network model.

Figure 11:
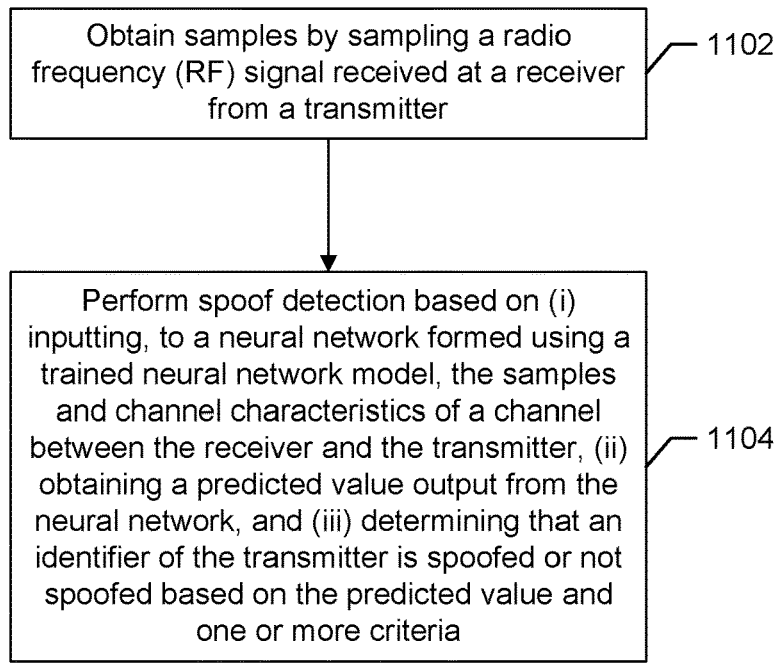

FIG. 11 is a flow chart illustrating an example flow 1100 in accordance with various embodiments. For convenience and simplicity of exposition, the flow 1100 and accompanying disclosures herein are described with reference to the architectures of the communications system 100 (FIG. 1). The flow 1100 may be carried out using different architectures as well.

Referring now to FIG. 11, a receiver (e.g., a WTRU, a base station, etc.) may obtain one or more samples by sampling an RF signal received (e.g., received at the receiver) from a transmitter (e.g., a base station, a WTRU, etc.) (1102). The receiver may perform spoof detection based at least in part on (i) inputting the samples and one or more channel characteristics to a neural network formed using a trained neural network model, (ii) obtaining a predicted value output from the neural network, and/or (iii) determining that an identifier of the transmitter is spoofed or not spoofed based on the predicted value and one or more criteria (1104). The channel characteristics may include channel characteristics of the channel between the receiver and the transmitter. The channel characteristics may include any of an estimated channel input response and an accumulation of estimated channel input response.

In various embodiments, the receiver may input one or more statistical channel descriptions to the neural network in connection with performing spoof detection (not shown). In various embodiments, the receiver may determine a statistical description of the channel based at least in part on the channel characteristics, and/or may obtain the trained neural network model based on the statistical description of the channel. In various embodiments, the receiver may obtain the trained neural network model at least in part by selecting the trained neural network model from a repository based on the statistical description. In various embodiments, the receiver may obtain the trained neural network model at least in part by determining (generating) the trained neural network model based on the statistical description.

In various embodiments, the receiver may determine (generate) the trained neural network model based at least in part on augmenting one or more samples of one or more RF signals based on one or more signal impairments, and/or training an untrained neural network or a partially trained neural network using the augmented second samples. In various embodiments, the impairments may include any of (i) one or more signal impairments other than those associated or attributed to a transmitter, (ii) one or more signal impairments that occur after transmission, and (iii) one or more propagation characteristics typical of a channel between a transmitter and a receiver. In various embodiments, the receiver may augment the samples of the RF signals using one or more transforms that mimic the one or more signal impairments. In various embodiments, the receiver may generate the transforms based on the signal impairments, and/or may augment the samples at least in part by applying the transforms to the samples.

In various embodiments, the receiver may determine (generate) the trained neural network model based at least in part on augmenting one or more samples of one or more RF signals based on one or more propagation characteristics typical of a channel between a transmitter and a receiver, and/or training an untrained neural network or a partially trained neural network using the augmented samples. In various embodiments, the receiver may augment the samples of the RF signals at least in part by augmenting the samples using one or more transforms that mimic the propagation characteristics. In various embodiments, the receiver may generate the transforms based on the propagation characteristics, and/or may augment the samples at least in part by applying the transforms to the samples. In various embodiments, one or more of the transforms may mimic a realistic channel impulse response. In various embodiments, one or more of the transforms may be FIR filters.

In various embodiments, one or more of the transforms may mimics a realistic channel frequency spectrum. In various embodiments, one or more of the transforms may be a frequency domain filter. In various embodiments, the receiver may perform element-wise multiplication of the one or more second samples with filter coefficients of the filter in the frequency domain.

In various embodiments, the receiver may save the trained neural network as a neural network model. In various embodiments, the receiver may label the trained neural network. For example, the receiver may label the trained neural network based on any of a characteristic of a network in which the transmitter is deployed and a characteristic of an environment in which the transmitter is deployed. In various embodiments, the receiver may save the labeled, trained neural network as a neural network model.

FIG. 12 is a flow chart illustrating an example flow 1200 in accordance with various embodiments. For convenience and simplicity of exposition, the flow 1200 and accompanying disclosures herein are described with reference to the architectures of the communications system 100 (FIG. 1). The flow 1200 may be carried out using different architectures as well.

Referring now to FIG. 12, a first device (e.g., a server, database, etc.) may receive, from a second device (e.g., a WTRU, a base station, etc.) one of more of (i) one or more channel characteristics of a channel between a transmitter of a third device (e.g., a base station, a WTRU, etc.) and a receiver of the second device and (ii) a statistical description of the channel between the transmitter and the receiver (1202). The channel characteristics may include any of an estimated channel input response and an accumulation of estimated channel input response. The first device may analyze the one of more of (i) the channel characteristics and (ii) the statistical description (1204). The first device may select, from a repository, a trained neural network model or a partially trained neural network model based on the analysis (1206). In various embodiments, the repository may be (or include) any of a database and a data store. In various embodiments, the repository is hosted on any of the first device or a fourth device that may be accessible to the first device. The first device may transmit the trained neural network model to the second device (1208).

Figure 13:
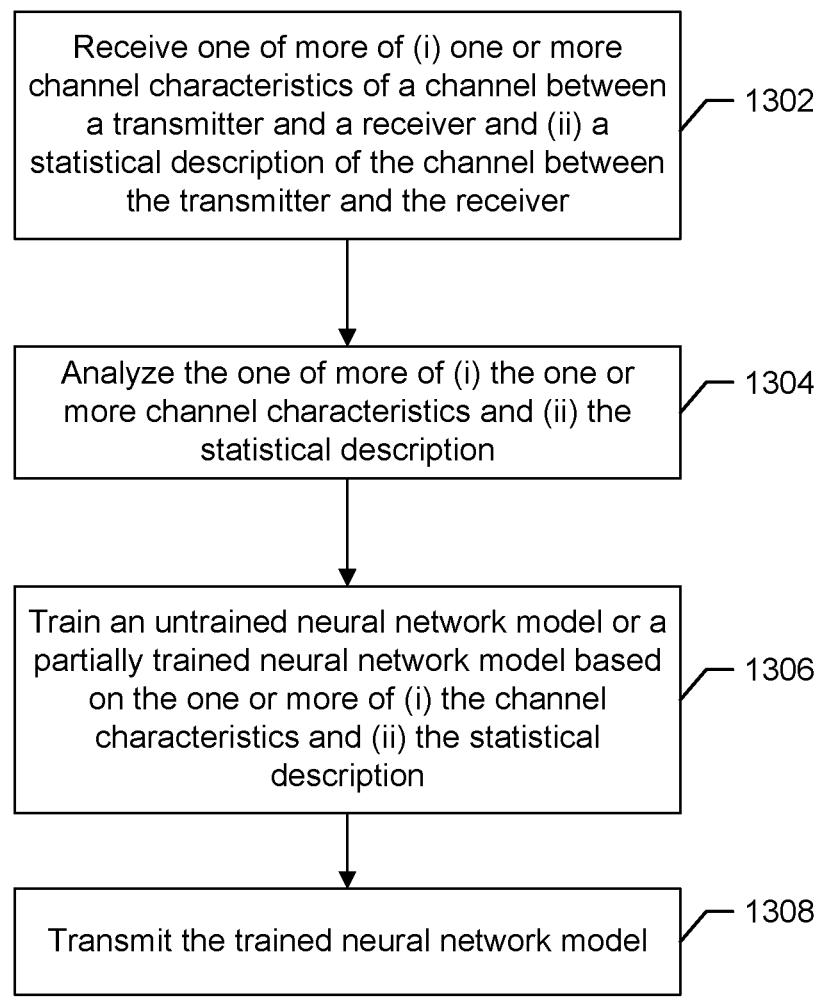

FIG. 13 is a flow chart illustrating an example flow 1300 in accordance with various embodiments. For convenience and simplicity of exposition, the flow 1300 and accompanying disclosures herein are described with reference to the architectures of the communications system 100 (FIG. 1). The flow 1300 may be carried out using different architectures as well.

Referring now to FIG. 13, a first device (e.g., a server, database, etc.) may receive, from a second device (e.g., a WTRU, a base station, etc.) one of more of (i) one or more channel characteristics of a channel between a transmitter of a third device (e.g., a base station, a WTRU, etc.) and a receiver of the second device and (ii) a statistical description of the channel between the transmitter and the receiver (1302). The channel characteristics may include any of an estimated channel input response and an accumulation of estimated channel input response. The first device may analyze the one of more of (i) the channel characteristics and (ii) the statistical description (1304). The first device may train an untrained neural network model or a partially trained neural network model based on the one or more of (i) the channel characteristics and (ii) the statistical description (1306). The first device may transmit the trained neural network model to the second device (1308).

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶ 6 or means-plus-function claim format, and any claim without the terms "means for" is not so intended.

What is claimed is:

1. A method comprising:
    obtaining one or more samples by sampling a radio frequency (RF) signal received at a receiver from a transmitter;
    obtaining one or more channel characteristics of a channel between the receiver and the transmitter; and
    performing RF fingerprinting based at least in part on:
    inputting the one or more samples and the one or more channel characteristics as inputs to a neural network; and
    obtaining a predicted value output from the neural network.

2. The method of claim 1, wherein one or more statistical channel descriptions are input to the neural network in connection with performing RF fingerprinting.

3. The method of claim 1, comprising:
    determining that an identifier of the transmitter is spoofed or not spoofed based on the predicted value and one or more criteria.

4. The method of claim 3, wherein one or more statistical channel descriptions are input to the neural network in connection with performing spoof detection.

5. The method of claim 1, wherein the neural network is formed using a trained neural network model.

6. The method of claim 5, comprising:
    determining a statistical description of the channel based at least in part on the one or more channel characteristics; and
    obtaining the trained neural network model based on the statistical description of the channel.

7. The method of claim 6, wherein obtaining the trained neural network model comprises:
    selecting the trained neural network model from a repository, wherein the trained neural network model is selected based on the statistical description.

8. The method of claim 6, wherein obtaining the trained neural network model comprises:
    determining the trained neural network model based on the statistical description.

9. The method of claim 8, wherein the one or more samples are one or more first samples, and wherein determining the trained neural network model comprises:
    augmenting one or more second samples of one or more RF signals based on one or more signal impairments; and
    training an untrained neural network or a partially trained neural network using the augmented one or more second samples.

10. The method of claim 9, wherein the one or more signal impairments comprise any of:
    one or more signal impairments other than those associated or attributed to a transmitter;
    one or more signal impairments that occur after transmission; and
    one or more propagation characteristics typical of a channel between a transmitter and a receiver.

11. The method of claim 9, wherein augmenting one or more second samples of one or more RF signals comprises:
    augmenting the one or more second samples using one or more transforms that mimic the one or more signal impairments.

12. The method of claim 11, comprising:
    generating the one or more transforms based on the one or more signal impairments, and wherein augmenting the one or more second samples comprises:
    applying the one or more transforms to the one or more second samples.

13. The method of claim 12, wherein at least one of the one or more transforms mimics a realistic channel impulse response.

14. The method of claim 13, wherein the at least one of the one or more transforms comprises a finite impulse response filter.

15. The method of claim 12, wherein at least one of the one or more transforms mimics a realistic channel frequency spectrum.

16. The method of claim 15, wherein the at least one of the one or more transforms comprises a frequency domain filter.

17. The method of claim 16, wherein at least one of the one or more transforms mimics a realistic channel frequency spectrum, and wherein applying the one or more transforms to the one or more second samples comprises: performing element-wise multiplication of the one or more second samples with filter coefficients of the frequency domain filter.

18. The method of claim 9, comprising:
    saving the trained neural network as a neural network model.

19. The method of claim 9, comprising:
labeling the trained neural network.

20. The method of claim 19, wherein labeling the trained neural network comprises:
labeling the trained neural network based on any of a characteristic of a network in which the transmitter is deployed and a characteristic of an environment in which the transmitter is deployed.

21. The method of claim 19, comprising:
saving the labeled, trained neural network as a neural network model.

22. The method of claim 8, wherein the one or more samples are one or more first samples, and wherein determining the trained neural network model comprises:
augmenting one or more second samples of one or more RF signals based on one or more propagation characteristics typical of a channel between a transmitter and a receiver; and
training an untrained neural network or a partially trained neural network using the augmented one or more second samples.

23. The method of claim 22, wherein augmenting one or more second samples of one or more RF signals comprises:
augmenting the one or more second samples using one or more transforms that mimic the one or more propagation characteristics.

24. The method of claim 23, comprising:
generating the one or more transforms based on the one or more propagation characteristics, and wherein augmenting the one or more second samples comprises:
applying the one or more transforms to the one or more second samples.

25. The method of claim 1, wherein the one or more channel characteristics comprise any of an estimated channel input response and an accumulation of estimated channel input response.

26. An apparatus comprising circuitry, including any one or more of a processor and memory, the circuitry configured to:
obtain one or more samples by sampling a radio frequency (RF) signal received at a receiver from a transmitter;
obtain one or more channel characteristics of a channel between the receiver and the transmitter; and
perform RF fingerprinting based at least in part on:
inputting the one or more samples and the one or more channel characteristics as inputs to a neural network; and
obtaining a predicted value output from the neural network.

27. The apparatus of claim 26, wherein one or more statistical channel descriptions are input to the neural network in connection with performing RF fingerprinting.

28. The apparatus of claim 26, wherein the circuitry is configured to:
determine that an identifier of the transmitter is spoofed or not spoofed based on the predicted value and one or more criteria.

29. The apparatus of claim 28, wherein one or more statistical channel descriptions are input to the neural network in connection with performing spoof detection.

30. The apparatus of claim 26, wherein the neural network is formed using a trained neural network model.

31. The apparatus of claim 30, wherein the circuitry is configured to:
determine a statistical description of the channel based at least in part on the one or more channel characteristics; and
obtain the trained neural network model based on the statistical description of the channel.

32. The apparatus of claim 31, wherein, to obtain the trained neural network model, the circuitry is configured to:
select the trained neural network model from a repository, wherein the trained neural network model is selected based on the statistical description.

33. The apparatus of claim 31, wherein, to obtain the trained neural network model, the circuitry is configured to:
determine the trained neural network model based on the statistical description.

34. The apparatus of claim 33, wherein the one or more samples are one or more first samples, and wherein, to determine the trained neural network model, the circuitry is configured to:
augment one or more second samples of one or more RF signals based on one or more signal impairments; and
train an untrained neural network or a partially trained neural network using the augmented one or more second samples.

35. The apparatus of claim 34, wherein the one or more signal impairments comprise any of:
one or more signal impairments other than those associated or attributed to a transmitter;
one or more signal impairments that occur after transmission; and
one or more propagation characteristics typical of a channel between a transmitter and a receiver.

36. The apparatus of claim 34, wherein the circuitry is configured to:
augment the one or more second samples using one or more transforms that mimic the one or more signal impairments.

37. The apparatus of claim 36, wherein the circuitry is configured to:
generate the one or more transforms based on the one or more signal impairments; and
apply the one or more transforms to the one or more second samples.

38. The apparatus of claim 37, wherein at least one of the one or more transforms mimics a realistic channel impulse response.

39. The apparatus of claim 38, wherein the at least one of the one or more transforms comprises a finite impulse response filter.

40. The apparatus of claim 37, wherein at least one of the one or more transforms mimics a realistic channel frequency spectrum.

41. The apparatus of claim 40, wherein the at least one of the one or more transforms comprises a frequency domain filter.

42. The apparatus of claim 41, wherein at least one of the one or more transforms mimics a realistic channel frequency spectrum, and wherein the circuitry is configured to perform element-wise multiplication of the one or more second samples with filter coefficients of the frequency domain filter.

43. The apparatus of claim 34, wherein the circuitry is configured to:
save the trained neural network as a neural network model.

44. The apparatus of claim 34, wherein the circuitry is configured to:
label the trained neural network.

45. The apparatus of claim 44, wherein the circuitry is configured to:
    label the trained neural network based on any of a characteristic of a network in which the transmitter is deployed and a characteristic of an environment in which the transmitter is deployed.

46. The apparatus of claim 44, wherein the circuitry is configured to:
    save the labeled, trained neural network as a neural network model.

47. The apparatus of claim 33, wherein the one or more samples are one or more first samples, and wherein, to determine the trained neural network model, the circuitry is configured to:
    augment one or more second samples of one or more RF signals based on one or more propagation characteristics typical of a channel between a transmitter and a receiver; and
    train an untrained neural network or a partially trained neural network using the augmented one or more second samples.

48. The apparatus of claim 47, wherein the circuitry is configured to:
    augment the one or more second samples using one or more transforms that mimic the one or more propagation characteristics.

49. The apparatus of claim 48, wherein the circuitry is configured to:
    generate the one or more transforms based on the one or more propagation characteristics; and
    apply the one or more transforms to the one or more second samples.

50. The apparatus of claim 26, wherein the one or more channel characteristics comprise any of an estimated channel input response and an accumulation of estimated channel input response.

51. A method comprising:
    performing, at a receiver, radio frequency (RF) fingerprinting based at least in part on:
    inputting, to a neural network, (i) one or more samples of a RF signal received from a transmitter and (ii) one or more channel characteristics of a channel between the receiver and the transmitter; and
    obtaining a predicted value output from the neural network.

52. An apparatus comprising:
    circuitry, including any one or more of a processor and memory, the circuitry configured to perform radio frequency (RF) fingerprinting, wherein the RF fingerprinting comprises:
    inputting, to a neural network, (i) one or more samples of a RF signal received from a transmitter and (ii) one or more channel characteristics of a channel between the apparatus and the transmitter; and
    obtaining a predicted value output from the neural network.

\* \* \* \* \*